United States Patent
Matsuo

(10) Patent No.: US 10,783,278 B2
(45) Date of Patent: Sep. 22, 2020

(54) SIGNATURE GENERATION DEVICE, SIGNATURE VERIFICATION DEVICE, SIGNATURE GENERATION METHOD, AND SIGNATURE VERIFICATION METHOD

(71) Applicant: PANASONIC INTELLECTUAL PROPERTY MANAGEMENT CO., LTD., Osaka (JP)

(72) Inventor: Masakatsu Matsuo, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 424 days.

(21) Appl. No.: 15/533,403

(22) PCT Filed: Dec. 4, 2015

(86) PCT No.: PCT/JP2015/006023
§ 371 (c)(1),
(2) Date: Jun. 6, 2017

(87) PCT Pub. No.: WO2016/103589
PCT Pub. Date: Jun. 30, 2016

(65) Prior Publication Data
US 2017/0344758 A1 Nov. 30, 2017

(30) Foreign Application Priority Data
Dec. 24, 2014 (JP) .................................. 2014-261172

(51) Int. Cl.
*H04L 9/08* (2006.01)
*G09C 5/00* (2006.01)
(Continued)

(52) U.S. Cl.
CPC ............ *G06F 21/64* (2013.01); *G06F 21/602* (2013.01); *G09C 5/00* (2013.01); *H04L 9/0643* (2013.01);
(Continued)

(58) Field of Classification Search
CPC ..... G06F 21/64; G06F 21/602; H04L 9/3247; H04L 9/0643; H04L 2209/68; H04L 9/00;
(Continued)

(56) References Cited

U.S. PATENT DOCUMENTS 6,009,176 A * 12/1999 Gennaro ............... H04L 9/3247
370/522
6,959,384 B1 * 10/2005 Serret-Avila ............ G06F 21/64
713/176
(Continued)

FOREIGN PATENT DOCUMENTS

JP 2000-215379 A 8/2000
JP 2001-045411 A 2/2001
(Continued)

OTHER PUBLICATIONS

Eiji Okamoto, "An Introduction to the Theory of Cryptography", Kyoritsu Shuppan, Second Edition Fourth Printing, Sep. 15, 2005, pp. 155-160 (with English language translation).
(Continued)

*Primary Examiner* — Daniel B Potratz
*Assistant Examiner* — Vu V Tran
(74) *Attorney, Agent, or Firm* — Greenblum & Bernstein, P.L.C.

(57) ABSTRACT

A signature generation device includes a data acquirer acquiring a plurality of mutually related pieces of data including first data and a signature generator generating first signature data for the first data and correlation information based on the first data, the correlation information indicating
(Continued)

correlation among the plurality of pieces of data, and a signature key. The signature generation device ensures relevance among the plurality of pieces of data.

17 Claims, 20 Drawing Sheets

(51) Int. Cl.
    *G06F 21/60* (2013.01)
    *H04L 9/06* (2006.01)
    *H04L 9/32* (2006.01)
    *G06F 21/64* (2013.01)
    *H04L 9/14* (2006.01)
    *H04L 9/30* (2006.01)

(52) U.S. Cl.
    CPC .......... *H04L 9/0866* (2013.01); *H04L 9/0894* (2013.01); *H04L 9/14* (2013.01); *H04L 9/30* (2013.01); *H04L 9/3247* (2013.01)

(58) Field of Classification Search
    CPC ......... H04L 9/32; H04L 63/12; H04L 63/123; H04L 9/30; H04L 9/14; H04L 9/0894; H04L 9/0866; G09C 5/00
    See application file for complete search history.

(56) References Cited

U.S. PATENT DOCUMENTS

| | | | | |
|---|---|---|---|---|
| 2003/0196086 | A1* | 10/2003 | Murakami | H04N 1/32122 713/161 |
| 2004/0201765 | A1* | 10/2004 | Gammenthaler | G08B 13/19647 348/333.01 |
| 2005/0166044 | A1 | 7/2005 | Kanai et al. | |
| 2007/0022293 | A1 | 1/2007 | Hayashi et al. | |
| 2009/0199010 | A1* | 8/2009 | Hakuta | H04L 9/3236 713/176 |
| 2012/0128151 | A1* | 5/2012 | Boehm | G11B 20/00086 380/42 |
| 2014/0156997 | A1* | 6/2014 | Gopalakrishna Rao | H04N 21/235 713/176 |

FOREIGN PATENT DOCUMENTS

| | | |
|---|---|---|
| JP | 2002-215029 A | 7/2002 |
| JP | 2002-244555 A | 8/2002 |
| JP | 2007-060594 | 3/2007 |
| JP | 2008-060745 | 3/2008 |
| JP | 2009-253305 | 10/2009 |

OTHER PUBLICATIONS

International Search Report, dated Mar. 8, 2016 by the Japan Patent Office (JPO), in the corresponding International Appl. No. PCT/JP2015/006023.

Koji Tsuruta et al., "Proposal of Filesystem for Log with Falsification Detection by Hysteresis Signature (Partial English Translation)", Information Processing Society of Japan—Technical Report, published on Feb. 26, 2009, vol. 2009, No. 20, pp. 235-240.

Hiroki Takama, Isao Echizen, Hiroshi Yoshiura, "Clarifying technical requirements and proposing solution system for visual interrogation recording (Partial English Translation)", Information Processing Society of Japan—Technical Report, published on Jun. 15, 2009, vol. 2009-CSEC-45, pp. 1-6.

\* cited by examiner

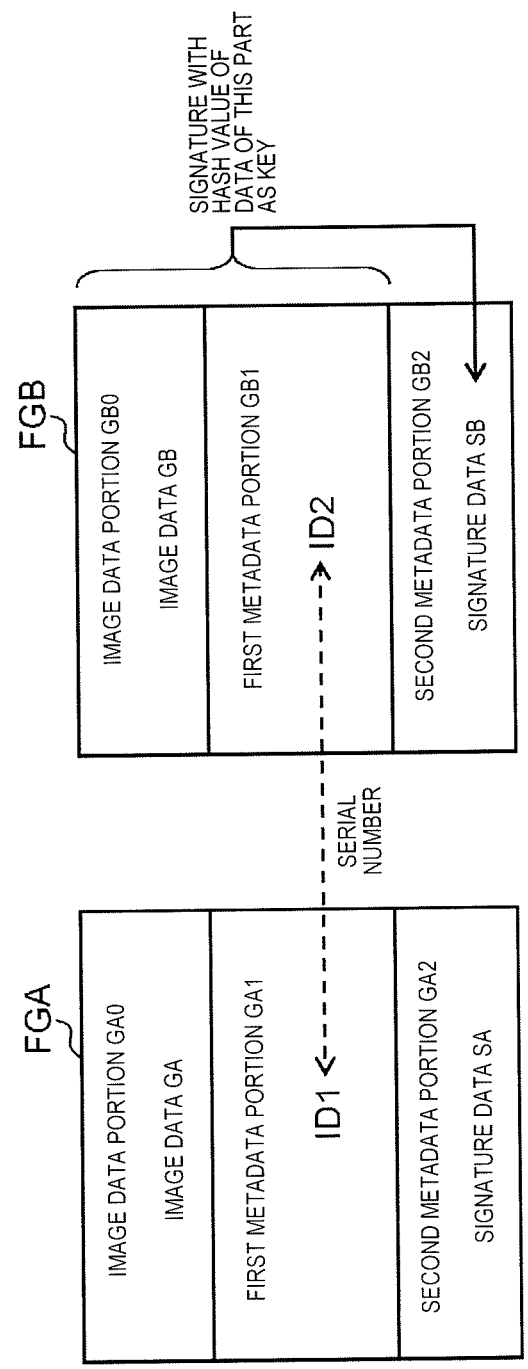

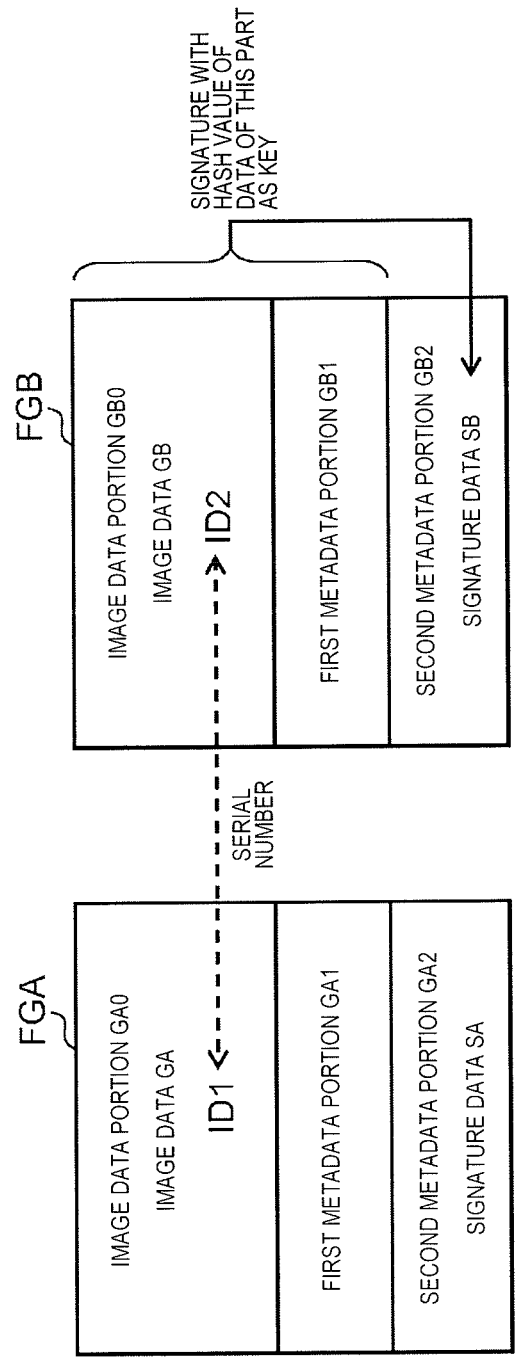

SIGNATURE GENERATION DEVICE, SIGNATURE VERIFICATION DEVICE, SIGNATURE GENERATION METHOD, AND SIGNATURE VERIFICATION METHOD

TECHNICAL FIELD

The present disclosure relates to a signature generation device signing digital data, a signature verification device verifying the signed digital data, a signature generation method, and a signature verification method.

BACKGROUND ART

A digital signature technology that ensures digital data not being tampered by attaching signature data to the digital data is previously known as disclosed in, for example, NPL 1. However, in digital signature, it is difficult to ensure relevance among a plurality of pieces of data.

An object of the present disclosure is to ensure relevance among a plurality of pieces of data.

CITATION LIST

Non-Patent Literature

NPL 1: Eiji Okamoto, "An Introduction to the Theory of Cryptography", Kyoritsu Shuppan, Sep. 15, 2005, Second Edition Fourth Printing, p. 155-p. 160

SUMMARY OF THE INVENTION

A signature generation device of the present disclosure includes a data acquirer acquiring a plurality of mutually related pieces of data including first data and a signature generator generating first signature data for the first data and correlation information based on the first data acquired by the data acquirer, the correlation information indicating correlation among the plurality of pieces of data, and a signature key.

A signature verification device of the present disclosure includes a data acquirer acquiring a plurality of mutually related pieces of data including first data and acquiring first signature data acquired by signature processing of the first data and correlation information indicating correlation among the plurality of pieces of data, a signature decrypter decrypting the first signature data by using a verification key, and a relevance determiner determining presence or absence of relevance among the plurality of pieces of data based on the correlation information.

A signature generation method of the present disclosure is a signature generation method in a signature generation device and includes a step of acquiring a plurality of mutually related pieces of data including first data and a step of generating first signature data for the first data and correlation information based on the acquired first data, the correlation information indicating correlation among the plurality of pieces of data, and a signature key.

A signature verification method of the present disclosure is a signature verification method in a signature verification device and includes a step of acquiring a plurality of mutually related pieces of data including first data and acquiring first signature data acquired by signature processing of the first data and correlation information indicating correlation among the plurality of pieces of data, a step of decrypting the first signature data by using a verification key, and a step of determining presence or absence of relevance among the plurality of pieces of data based on the correlation information.

According to the present disclosure, relevance among a plurality of pieces of data can be ensured.

BRIEF DESCRIPTION OF DRAWINGS

FIG. 15A is a schematic diagram describing relevance of image data in combined data having various file structures in the second exemplary embodiment.

FIG. 15B is a schematic diagram describing relevance of image data in the combined data having various file structures in the second exemplary embodiment.

DESCRIPTION OF EMBODIMENTS

Hereinafter, exemplary embodiments of the present disclosure will be described by using the drawings.

A scene photograph captured by a digital still camera, for example, may be employed as evidence in trial. However, the photograph captured by the digital still camera is digital image data. Thus, the data may be intentionally tampered, or one of a plurality of successive photographs may be removed and deleted. Thus, digital image data is pointed out not to have sufficient evidential admissibility in trial.

If a digital signature technology is used, for example, in the case of generating signature data per piece of digital image data of a plurality of pieces of digital image data, individual pieces of digital image data can be proved not to be tampered. However, in the case of one or a plurality of pieces of image data being removed from a plurality of successively captured pieces of digital image data, it is difficult to recognize the removal. That is, it is difficult to ensure relevance among the plurality of pieces of image data.

Hereinafter, a signature generation device, a signature verification device, a signature generation method, and a signature verification method that can ensure relevance among a plurality of pieces of data will be described.

The signature generation device of the exemplary embodiments below is applied to, for example, a digital still camera (hereinafter, simply referred to as a camera) that generates digital image data (hereinafter, referred to as image data).

The signature verification device of the exemplary embodiments below is applied to, for example, a personal computer (PC).

In the exemplary embodiments below, partial deletion of image data will be referred to as, for example, "tampering", and deletion of image data will be referred to as, for example, "deletion". An "image" will include, for example, a moving image (for example, a video) and a still image (for example, a photograph). Digital signature will be simply referred to as "signature".

First Exemplary Embodiment

Figure 1:
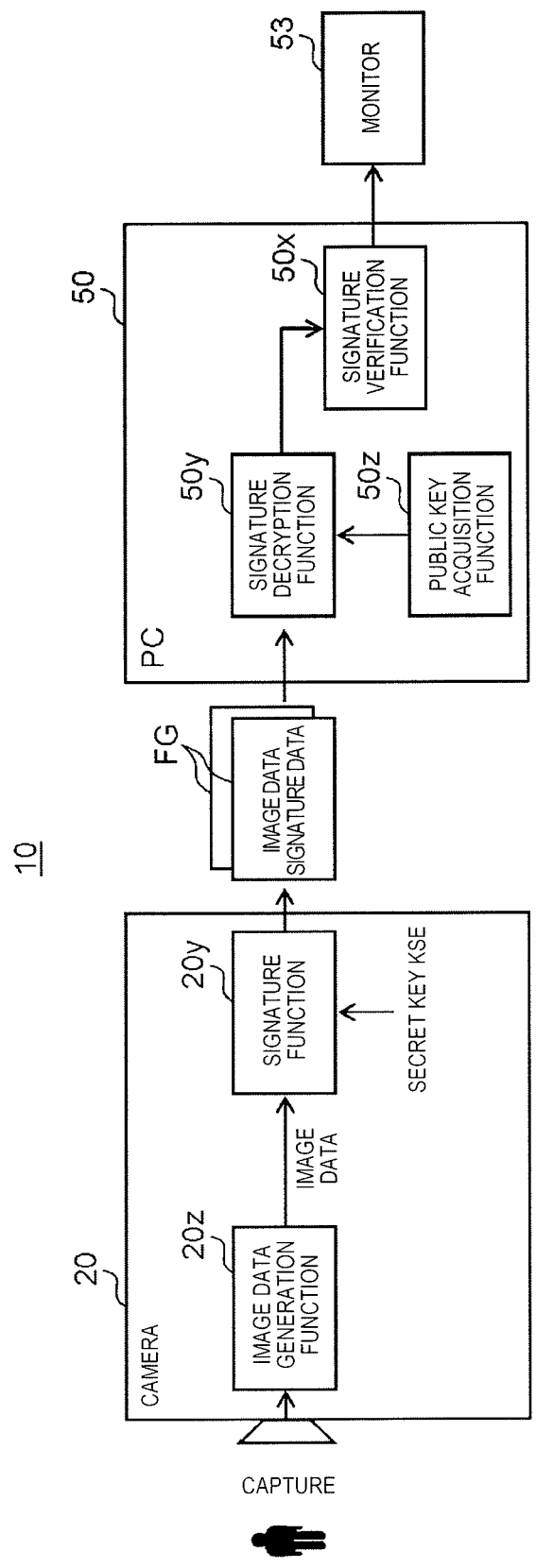
FIG. 1 is a schematic diagram illustrating a schematic configuration example of a signature processing system in a first exemplary embodiment.

FIG. 1 is a schematic diagram illustrating a schematic configuration example of signature processing system 10 in a first exemplary embodiment. Signature processing system 10 is configured of camera 20 and PC 50. Camera 20 and PC 50 do not particularly have communicators. Data is received and passed therebetween through, for example, a recording medium. Camera 20 and PC 50 may be configured to be connected directly through a communication cable or through a communication network.

In signature processing system 10, combined data FG that includes, for example, image data captured in camera 20 and signature data for the image data is read into PC 50. PC 50, for example, verifies the signature data included in combined data FG and displays a verification result on monitor 53.

Camera 20 has, for example, image data generation function 20z that captures a subject and generates captured image data, and signature function 20y that encrypts data including the image data with secret key KSE of camera 20 and generates signature data. Camera 20 is, for example, a terminal and is one example of the signature generation device.

PC 50 has, for example, public key acquisition function 50z that acquires public key KPE of camera 20, signature decryption function 50y that decrypts the signature data with public key KPE, and signature verification function 50x. Signature verification function 50x has a function of determining the presence or absence of tampering of image data or the presence or absence of relevance (for example, successiveness) among a plurality of pieces of image data based on the decrypted data. In the present exemplary embodiment or the exemplary embodiments below, the presence or absence of successiveness will be mainly illustrated as the presence or absence of relevance.

In consequence of determination by signature verification function 50x, monitor 53 displays "OK" in the case of the image data not being tampered and successiveness being guaranteed and displays "NG" in the case of tampering or successiveness not being guaranteed.

Figure 2:
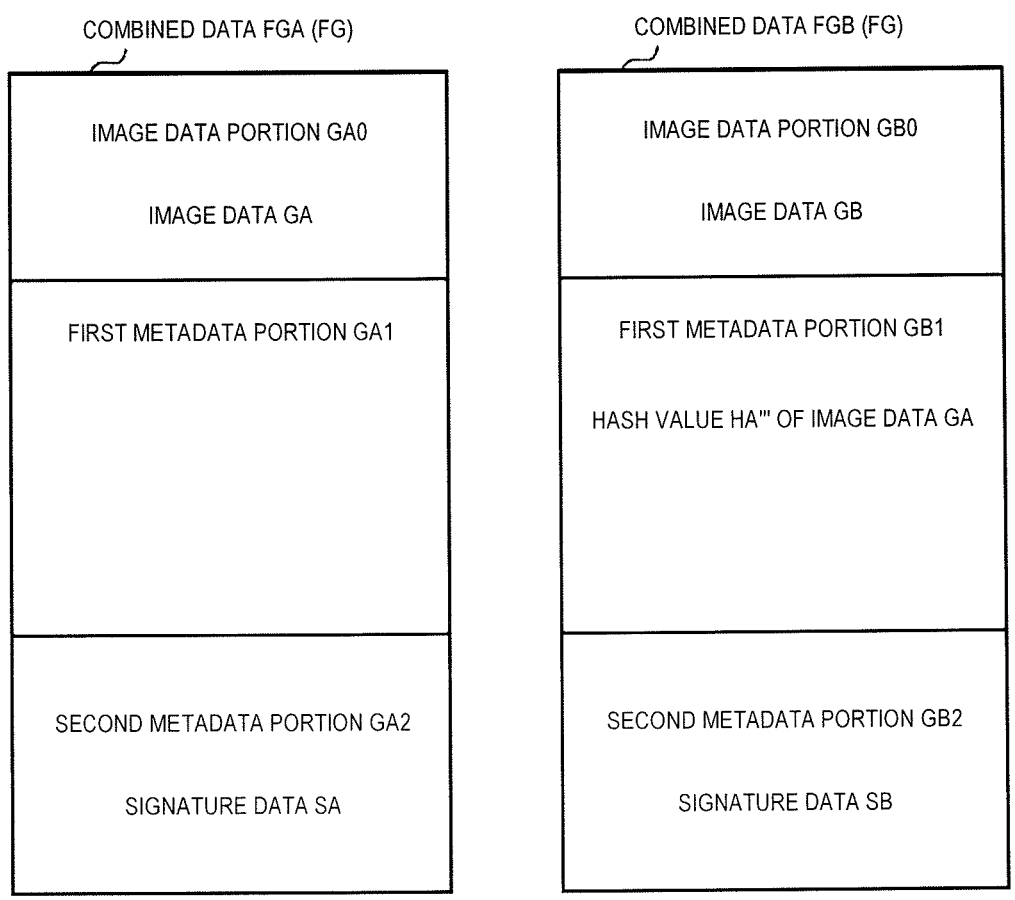
FIG. 2 is a schematic diagram illustrating a file structure example of combined data in the first exemplary embodiment.

FIG. 2 is a schematic diagram illustrating one example of a file structure of combined data FG. In FIG. 2, combined data FGA and combined data FGB that include two successive images are illustrated as combined data FG.

Combined data FGA includes image data portion GA0, first metadata portion GA1, and second metadata portion GA2. Image data portion GA0 includes image data GA. Second metadata portion GA2 includes signature data SA.

Combined data FGB includes image data portion GB0, first metadata portion GB1, and second metadata portion GB2. Image data portion GB0 includes image data GB. First metadata portion GB1 includes hash value HA''' that is calculated for image data GA of image data portion GA0. Second metadata portion GB2 includes signature data SB.

Hash value HA''' may be a hash value that is calculated for image data GA of image data portion GA0 and first metadata portion GA1 (hash value of image data GA and first metadata portion GA1).

A hash value that was calculated or is calculated for "A" is also described as a hash value of "A".

First metadata portion GB1 stores correlation information. The correlation information indicates correlation (relevance) among a plurality of pieces of data (for example, between image data GA and image data GB). In the present exemplary embodiment, the hash value of image data GA is illustrated as the correlation information.

Next, a configuration example of camera 20 will be described.

Figure 3:
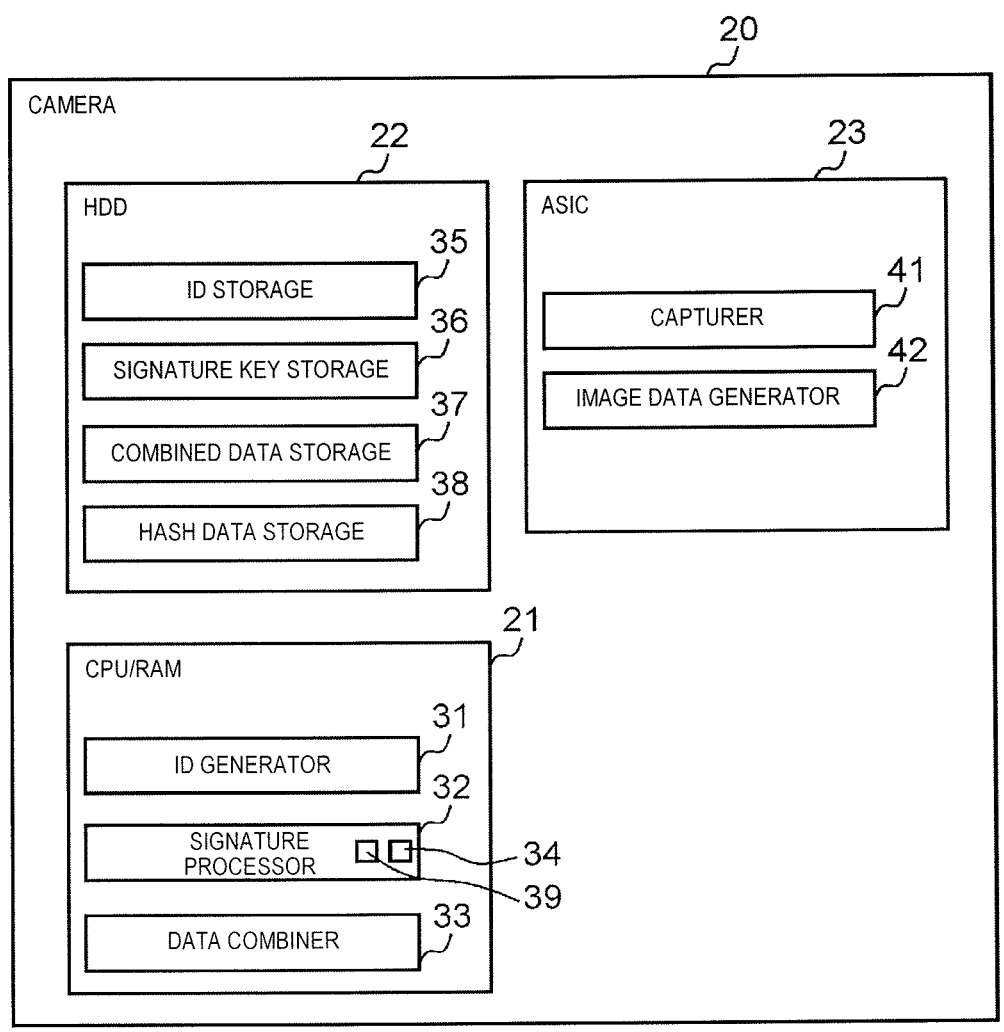
FIG. 3 is a block diagram illustrating a hardware configuration of a camera in the first exemplary embodiment.

FIG. 3 is a block diagram illustrating a hardware configuration example of camera 20.

Camera 20 captures an image and combines signature data in the captured image data to generate combined data. Camera 20 has, for example, central processing unit (CPU)/random access memory (RAM) 21, hard disk drive (HDD) 22, and application specific integrated circuit (ASIC) 23.

Camera 20, in the case of communicating with PC 50 through a communication network and sending the combined data, may include a media access control (MAC)/physical layer (PHY) that controls data transfer in the communication network.

CPU/RAM 21 is configured of, for example, a CPU and a RAM and has identification (ID) generator 31, signature processor 32, and data combiner 33.

Each time image data is generated, ID generator 31 generates a consecutive number (ID number) linked to the image data in such a manner that the value of the consecutive number is counted up in units of image data. ID generator 31 is not used in the present exemplary embodiment and is used in a modification example described later. ID generator 31 is one example of an identification information generator.

Signature processor 32 has hash calculator 34 and encryption processor 39 and encrypts the hash value of data to generate signature data.

Hash calculator 34 derives (for example, calculates) a hash value by using a hash function as a unidirectional function (for example, secure hash algorithm (SHA) or message digest 5 (MD5)). Encryption processor 39 encrypts data including the image data with secret key KSE. Hash calculator 34 is one example of a unidirectional function deriver.

Data combiner 33 combines the image data generated in image data generator 42 with the signature data generated in signature processor 32 to generate combined data.

HDD 22 has, for example, ID storage 35, signature key storage 36, combined data storage 37, and hash data storage 38. While the HDD is illustrated here, a storage medium other than the HDD (for example, a solid state drive (SSD) or a flash memory) may also be used.

ID storage 35, for example, stores an ID number as frame identification information linked to previously captured image data (previous ID number) and updates the ID number if a new ID number is generated. Like ID generator 31, ID storage 35 is not used in the present exemplary embodiment and is used in the modification example described later.

Signature key storage 36, for example, stores a secret key (one example of a signature key) that is used in a public key encryption scheme (for example, Rivest Shamir Adleman (RSA)). Encryption processing may be performed by, for example, a common key encryption scheme. In this case, signature key storage 36 stores a common key (one example of a signature key).

Combined data storage 37, for example, stores the combined data in which the image data generated in image data generator 42 with the signature data generated in signature processor 32.

Hash data storage 38, for example, stores the hash value calculated by hash calculator 34.

ASIC 23 has, for example, capturer 41 and image data generator 42. Image data generator 42 is one example of a data acquirer.

Capturer 41, if receiving a capture instruction, captures a subject and outputs an image signal. Capturer 41 is configured to include, for example, a charge coupled device (CCD) and a complementary metal oxide semiconductor (CMOS).

Image data generator 42, if receiving input of the image signal from capturer 41, generates image data and attaches additional data to the image data. The additional data includes, for example, position information and a timestamp (date and time information) from a global positioning system (GPS). The additional data may not be attached.

Figure 4:
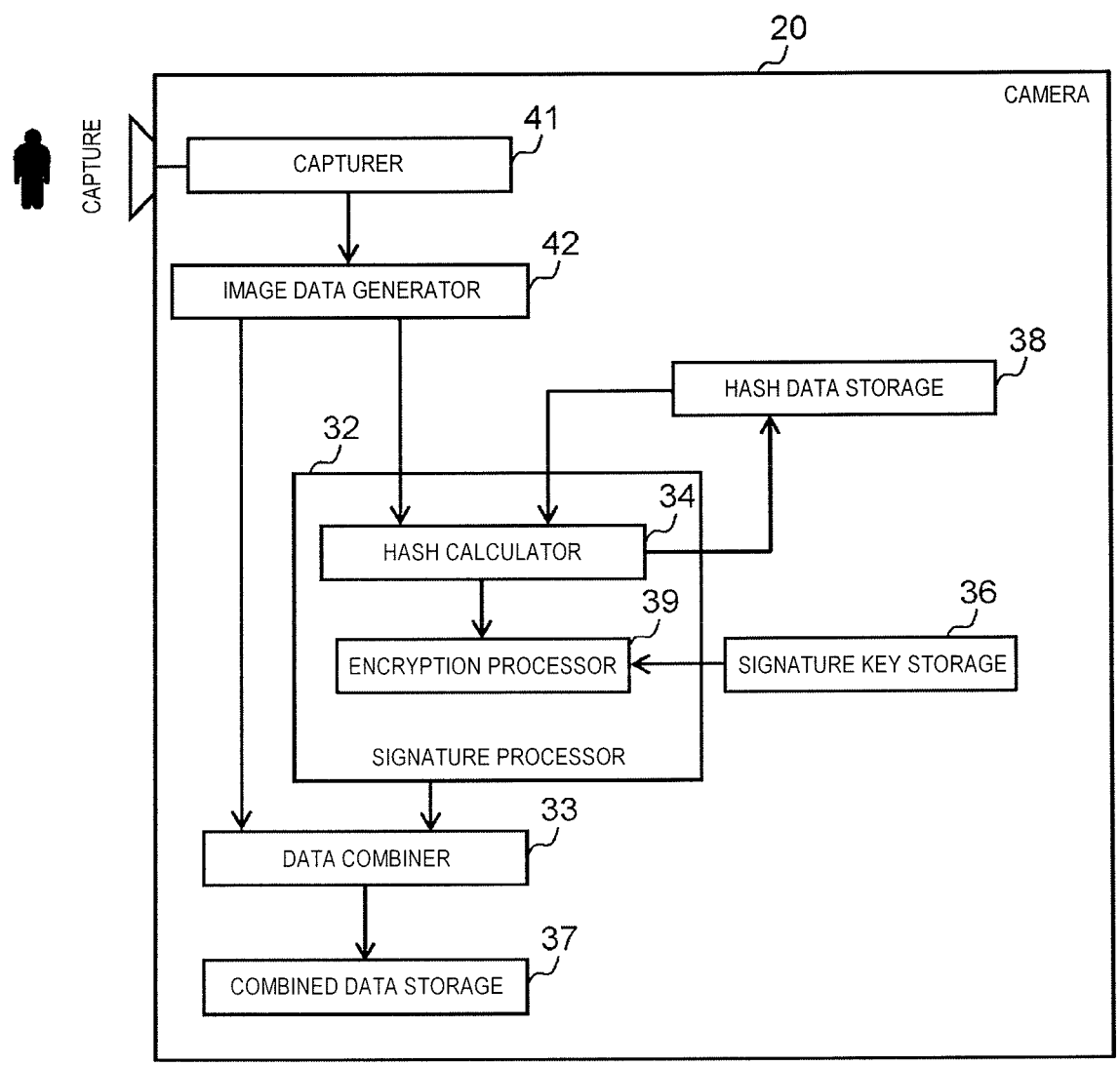
FIG. 4 is a block diagram illustrating a functional configuration example of the camera in the first exemplary embodiment.

FIG. 4 is a block diagram illustrating a functional configuration example of camera 20. Here, data that is the image data to which the additional data is added is regarded as the image data.

Camera 20 includes signature processor 32, data combiner 33, signature key storage 36, combined data storage 37, hash data storage 38, capturer 41, and image data generator 42.

Hash data storage 38, for example, stores the hash value of the image data calculated by hash calculator 34 in time series. The number of hash values of the image data that is stored in hash data storage 38 in time series may be any value. In the case of the number of hash values of the image data being greater than or equal to two, relevance of the image data is acquired as illustrated in FIG. 8 described later.

Signature processor 32 has hash calculator 34 and encryption processor 39 as described above. Signature processor 32 is one example of a signature generator.

Hash calculator 34 calculates a hash value by using a hash function for the image data generated by image data generator 42 and the previous hash value stored in hash data storage 38. Hash calculator 34 stores the calculated hash value in hash data storage 38 as the current hash value.

Encryption processor 39 encrypts the current hash value with secret key KSE stored in signature key storage 36 to generate signature data.

Data combiner 33 combines the generated signature data with the image data generated by image data generator 42 as combined data and stores the combined data in combined data storage 37.

Next, a configuration example of PC 50 will be described.

Figure 5:
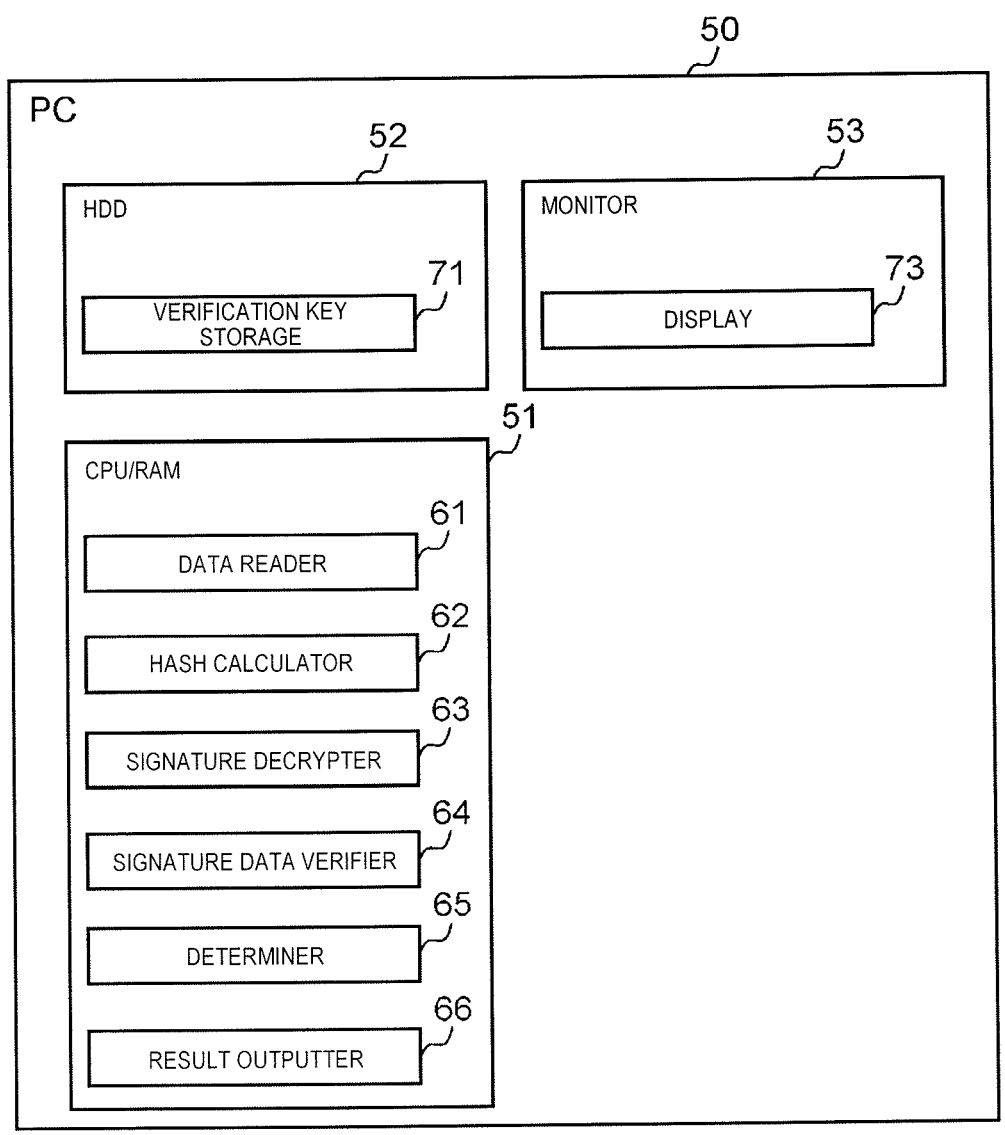
FIG. 5 is a block diagram illustrating a hardware configuration example of a PC in the first exemplary embodiment.

FIG. 5 is a block diagram illustrating a hardware configuration example of PC 50.

PC 50 verifies the image data combined with the signature data. PC 50 has, for example, CPU/RAM 51, HDD 52, and monitor 53. PC 50, in the case of communicating with camera 20 through a communication network and receiving the combined data, may include an MAC/PHY that controls data transfer in the communication network.

CPU/RAM 51 is configured of, for example, a CPU and a RAM and has data reader 61, hash calculator 62, signature decrypter 63, signature data verifier 64, determiner 65, and result outputter 66.

Data reader 61, for example, acquires the combined data or public key KPE of camera 20 from camera 20 through an interface such as a storage medium or a Universal Serial Bus (USB) or through a communication network. Data reader 61 is one example of a data acquirer.

Hash calculator 62, for example, derives (for example, calculates) a hash value by using a hash function as a unidirectional function (for example, SHA or MD5).

Signature decrypter 63, for example, decrypts the signature data with a public key (one example of a verification key) and acquires the hash value of data including the image data.

Signature data verifier 64, for example, compares the hash value calculated by hash calculator 62 with the hash value decrypted by signature decrypter 63 to verify the signature data as described later.

Determiner 65, for example, in the case of the hash value calculated by hash calculator 62 being equal to the hash value decrypted by signature decrypter 63, uses the hash value of the second metadata portion to determine the presence or absence of successiveness of the image data included in the combined data. Determiner 65 is one example of a relevance determiner.

Result outputter 66, for example, outputs a determination result of determiner 65 to monitor 53.

Monitor 53 has display 73 that displays the determination result. Monitor 53 may be included in PC 50 or may be separately disposed from PC 50.

HDD 52 has, for example, verification key storage 71. While the HDD is illustrated here, a storage medium other than the HDD (for example, an SSD or a flash memory) may also be used.

Verification key storage 71, for example, stores public key KPE (one example of a verification key) that is used in a public key encryption scheme. Encryption processing may be performed by, for example, a common key encryption scheme. In this case, verification key storage 71 stores a common key (one example of a signature key).

Public key KPE stored in verification key storage 71 may be acquired from camera 20, may be acquired from an image embedded in the image data, or may be registered in advance in PC 50. Decryption processing may be performed by, for example, a decryption scheme corresponding to a common key encryption scheme. In this case, a common key is stored.

Figure 6:
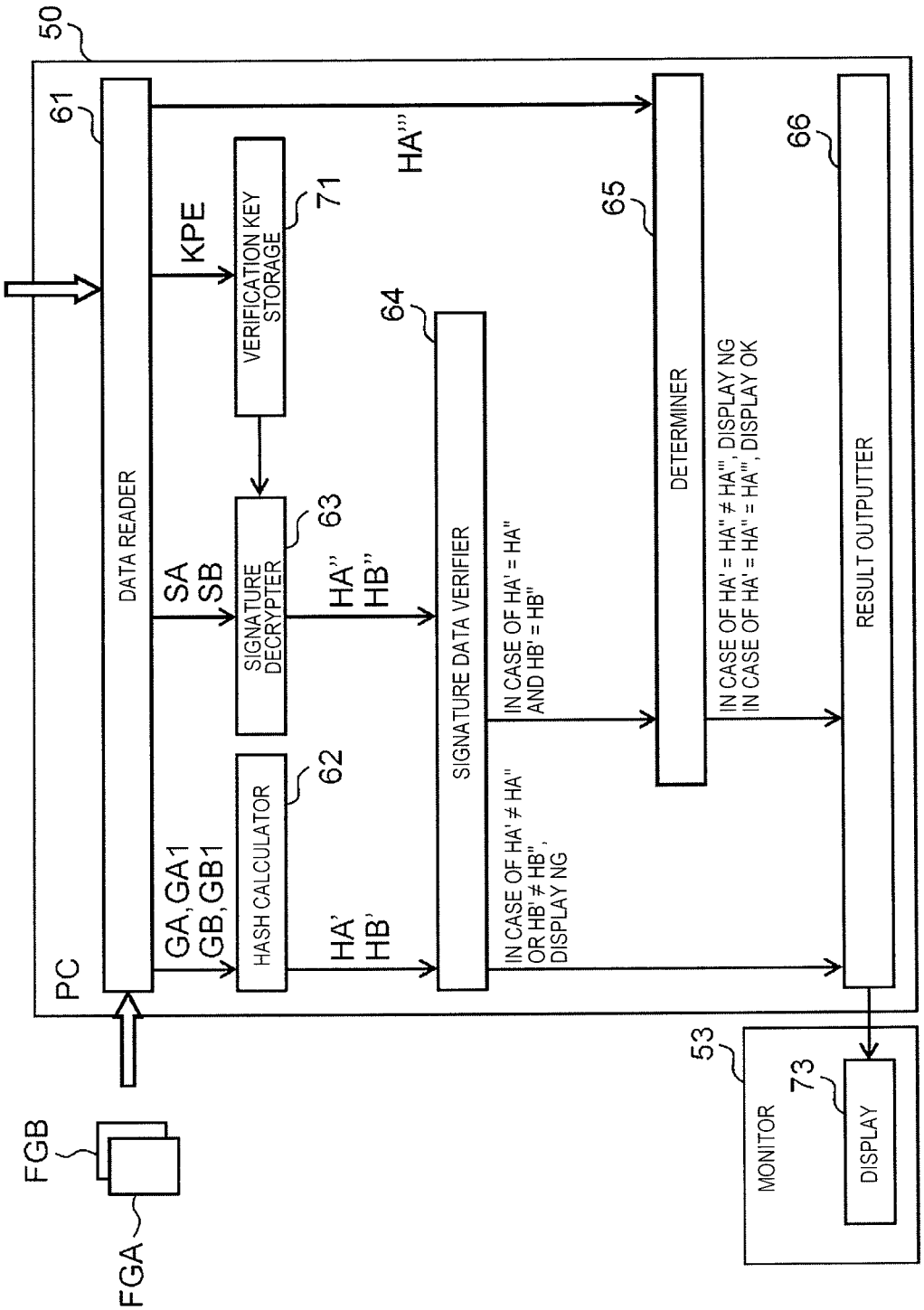
FIG. 6 is a block diagram illustrating a functional configuration of the PC in the first exemplary embodiment.

FIG. 6 is a block diagram illustrating a functional configuration example of PC 50.

PC 50 has data reader 61, hash calculator 62, signature decrypter 63, verification key storage 71, signature data verifier 64, determiner 65, and result outputter 66. PC 50 may include display 73.

Data reader 61, for example, reads successive combined data FGA and combined data FGB from camera 20. Data reader 61 acquires and stores the public key of camera 20 in verification key storage 71.

Here, combined data FGA is configured to include, for example, image data portion GA0, first metadata portion GA1, and second metadata portion GA2 as illustrated in FIG. 2. Similarly, combined data FGB is configured to include, for example, image data portion GB0, first metadata portion GB1, and second metadata portion GB2.

First metadata portion GB1 stores, for example, image data GA of image data portion GA0 and hash value HA''' of first metadata portion GA1 as illustrated in FIG. 2.

Similarly, first metadata portion GA1 stores, for example, the image data of the previous image data portion and the hash value of data of the previous first metadata portion. Hash calculation is performed by, for example, camera 20.

Hash calculator 62 calculates hash value HA' by using a hash function for image data GA of image data portion GA0 and first metadata portion GA1 read in data reader 61.

Similarly, hash calculator 62 calculates hash value HB' by using a hash function for image data GB of image data portion GB0 and first metadata portion GB1 read in data reader 61.

Signature decrypter 63 decrypts signature data SA stored in second metadata portion GA2 of combined data FGA read in data reader 61 to acquire hash value HA'' of image data GA of image data portion GA0 and first metadata portion GA1.

Similarly, signature decrypter 63 decrypts signature data SB stored in second metadata portion GB2 of combined data FGB read in data reader 61 to acquire hash value HB'' of image data GB of image data portion GB0 and first metadata portion GB1.

Signature data verifier 64 respectively compares hash values HA' and HB' calculated in hash calculator 62 with hash values HA'' and HB'' acquired in signature decrypter 63. In the case of HA'≠HA'' or HB'≠HB'', signature data verifier 64 determines verification of image data GA and image data GB to fail and outputs the determination result to result outputter 66. Result outputter 66 causes display 73 of monitor 53 to display "NG" (NG display) that represents a failed verification result.

Failing in verification of the image data means that the image data generated by camera 20 as the signature generation device is determined to be different from the image data acquired by PC 50 as the signature verification device. Thus, signature data verifier 64 can determine the image data in camera 20 not to match the image data in PC 50 and determines the image data to be tampered.

Meanwhile, in the case of HA'=HA'' and HB'=HB'', signature data verifier 64 outputs the comparison result to determiner 65.

Determiner 65 acquires hash value HA''' of image data GA included in first metadata portion GB1 of combined data FGB read in data reader 61. Determiner 65 compares hash value HA''' with above hash value HA' (=HA'').

In the case of HA'≠HA''', determiner 65 determines successiveness of image data GA and image data GB not to be acquired, determines verification of the image data to fail, and outputs the determination result to result outputter 66. Result outputter 66 causes display 73 of monitor 53 to display "NG" (NG display) that represents a failed verification result.

Meanwhile, in the case of HA'=HA''', determiner 65 determines successiveness of image data GA and image data GB to be guaranteed, determines verification of the image data to succeed, and outputs the determination result to result outputter 66. Result outputter 66 causes display 73 of monitor 53 to display "OK" (OK display) that represents a successful verification result.

Accordingly, with HA'=HA'' and HB'=HB'', PC 50 can verify correctness of image data GA and image data GB, that is, each piece of image data not being tampered. Furthermore, with HA'=HA''', PC 50 can ensure successiveness of image data GA and image data GB by using the correlation information related to image data GA included in combined data FGB that includes image data GB.

Next, a file structure example of the combined data will be described.

File structures of the combined data below are exemplified in addition to the file structure of the combined data illustrated in FIG. 2.

Figure 7A:
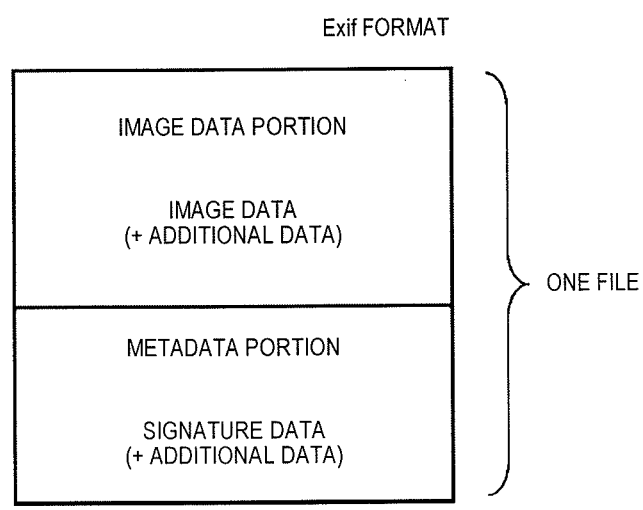
FIG. 7A is a schematic diagram illustrating a file structure example of the combined data generated by the camera in the first exemplary embodiment.
Figure 7B:
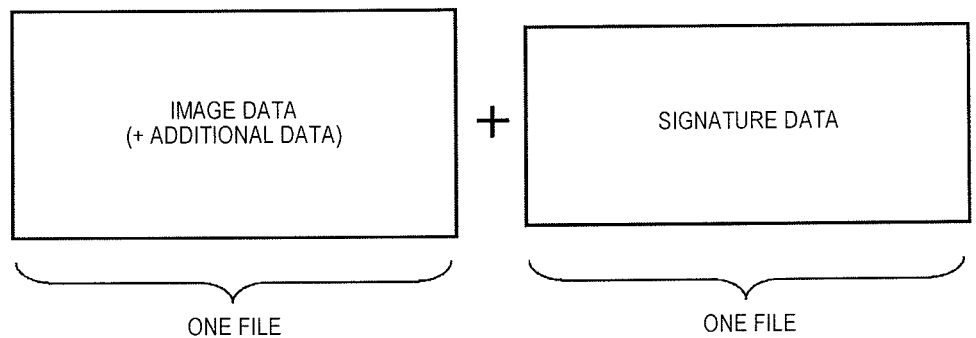
FIG. 7B is a schematic diagram illustrating a file structure example of the combined data generated by the camera in the first exemplary embodiment.

FIG. 7A and FIG. 7B are schematic diagrams illustrating file structure examples of the combined data generated by camera 20.

FIG. 7A illustrates exchangeable image file format (exif) format in which the image data portion and the metadata portion are configured as one file. In exif format, for example, the metadata portion includes the signature data, and the image data portion includes the image data. The additional data may be linked to the signature data. The additional data may be linked to the image data. The additional data includes, for example, information as to a location and a date and a time of capturing of the image data. If exif format is used, data management can be facilitated.

FIG. 7B is an example in which the image data and the signature data are configured as separate files. In this case as well, the additional data may be linked to the image data or the signature data.

Figure 8A:
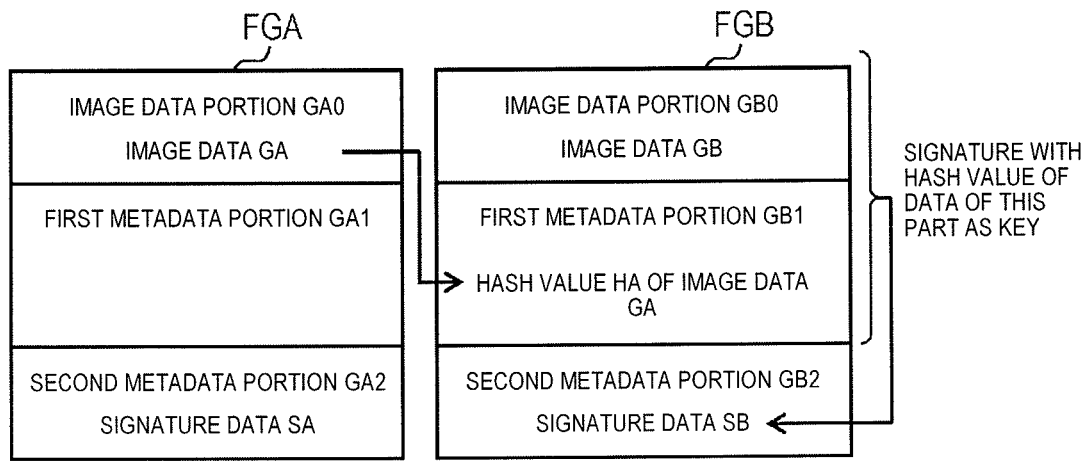
FIG. 8A is a schematic diagram for describing relevance of image data in the combined data having various file structures in the first exemplary embodiment.
Figure 8B:
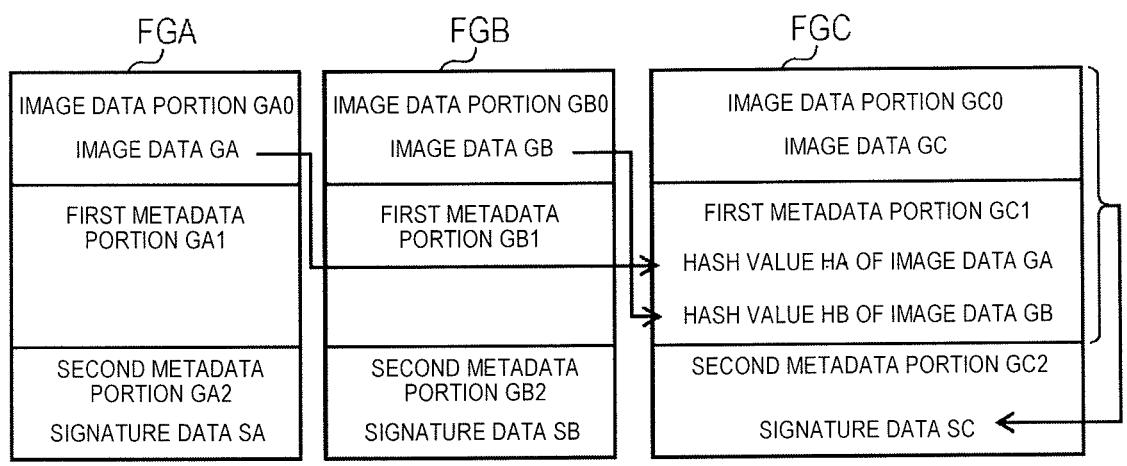
FIG. 8B is a schematic diagram for describing relevance of image data in the combined data having various file structures in the first exemplary embodiment.
Figure 8C:
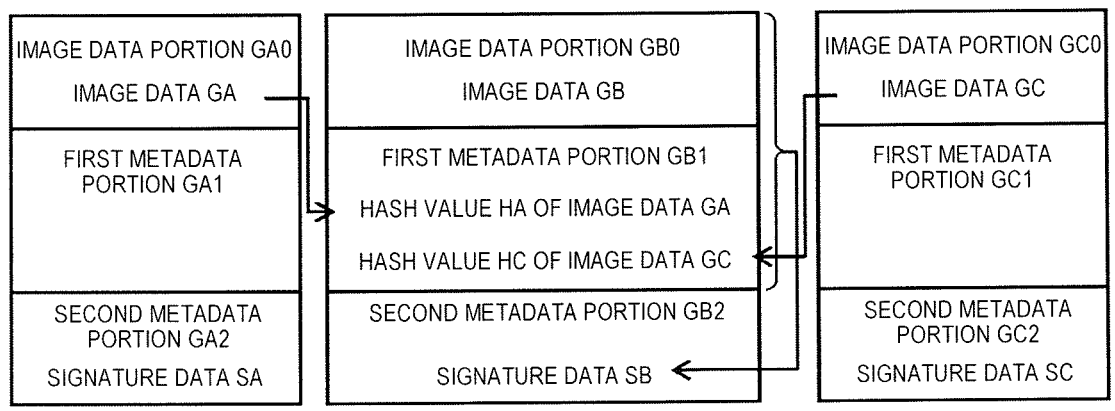
FIG. 8C is a schematic diagram for describing relevance of image data in the combined data having various file structures in the first exemplary embodiment.

FIG. 8A to FIG. 8C are schematic diagrams for describing relevance of the image data in the combined data having various file structures.

In FIG. 8A, a hash value is calculated by using a hash function for image data GB and hash value HA of previous image data GA, and the hash value is encrypted by using the secret key (signature key) stored in signature key storage 36 to generate signature data SB of combined data FGB.

That is, the signature data is generated by using the correlation information (here, the hash value of the image data) based on the past image data. Thus, successiveness (relevance) of the image data can be determined by signature verification. The file structure illustrated in FIG. 8A is the same as the file structure illustrated in FIG. 2.

FIG. 8B illustrates the case of three time-series successive pieces of combined data and use of the hash value of each piece of past (second previous) image data as the correlation information. Signature data SC that is included in third combined data FGC is generated based on image data GC included in current combined data FGC, hash value HA of second previous image data GA, and hash value HB of previous image data GB.

Specifically, signature processor 32 calculates a hash value by using a hash function for image data GC, hash value HA, and hash value HB and encrypts the hash value by using the signature key to generate signature data SC. In FIG. 8B, signature generation is performed at the time of current data acquisition.

Therefore, since the signature data is generated by using a plurality of pieces of past image data of the verified image data, successiveness of the verified image data with the plurality of pieces of past image data can be ensured. In addition, increasing the number of related pieces of image data enables confirmation of missing or the like of the image data within the range of relation, and the ability to ensure successiveness can be improved.

FIG. 8C illustrates, in the same manner as FIG. 8B, the case of three time-series successive pieces of combined data and use of the hash value of each piece of previously and subsequently acquired image data as the correlation information. Signature data SB of combined data FGB is generated based on image data GB, hash value HA of previous image data GA, and hash value HC of subsequent image data GC.

Specifically, signature processor 32 calculates a hash value by using a hash function for image data GB, hash value HA, and hash value HC and encrypts the hash value by using the signature key to generate signature data SB. In FIG. 8C, signature generation is performed at the time of subsequent data acquisition.

Therefore, since the signature data is generated by using the previous and subsequent image data of the verified image data, successiveness with the previous and subsequent image data can be ensured. In addition, increasing the number of related pieces of image data enables confirmation of missing or the like of the image data within the range of relation, and the ability to ensure successiveness can be improved.

Next, an operation example of signature processing system 10 will be described.

Figure 9:
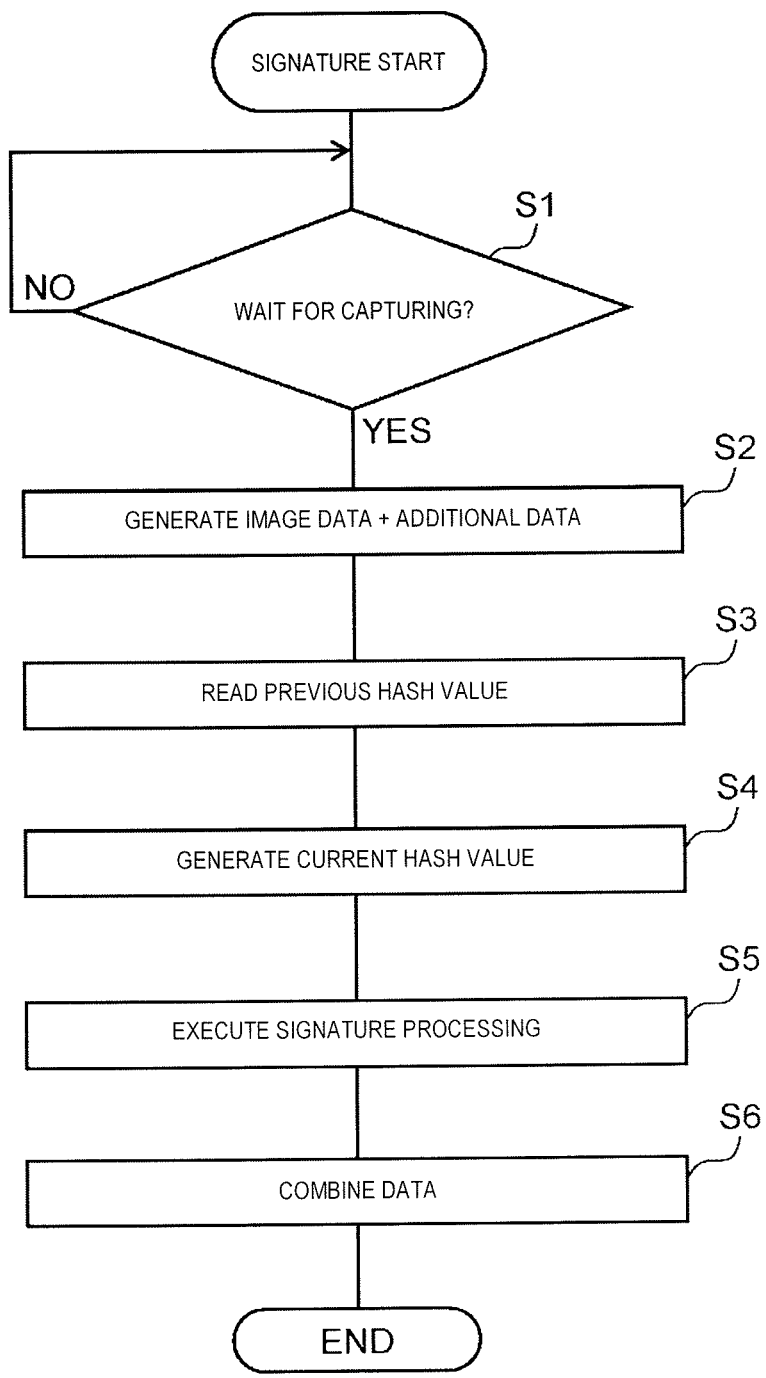
FIG. 9 is a flowchart illustrating one example of a signature operation procedure by the camera in the first exemplary embodiment.

FIG. 9 is a flowchart illustrating one example of a signature operation procedure by camera 20.

Capturer 41 waits until receiving a capture instruction and, if receiving the capture instruction, captures a subject and outputs an image signal (S1). The capture instruction is received by, for example, an operating unit (button or the like).

Image data generator 42, if receiving input of the image signal from capturer 41, generates the image data to which the additional data is attached (S2).

Signature processor 32 reads the previous hash value from hash data storage 38 (S3).

Hash calculator 34 calculates the current hash value by using a hash function for the current image data and the previous hash value read from hash data storage 38 in Step S3 (S4).

Signature processor 32 stores the current hash value in hash data storage 38. Signature processor 32 encrypts the hash value with the secret key stored in signature key storage 36 to generate the signature data (S5).

Data combiner 33 combines the image data generated in image data generator 42 with the signature data generated in signature processor 32 to generate the combined data and stores the combined data in combined data storage 37 (S6). Then, camera 20 finishes the present operation.

Next, an operation example of PC 50 will be described. As described above, there are various methods in the case of acquiring the public key for decryption of the image data as preparation for PC 50.

For example, in the case of the public key being embedded in the image data, the public key may be extracted by PC 50 performing image processing for the image data. In the case of the public key being stored in advance in, for example, a read only memory (ROM) of PC 50, the public key may be acquired by PC 50 reading the public key. In the case of PC 50 being communicably connected to camera 20, PC 50 may receive the public key from camera 20. PC 50 may be connected to a specific server apparatus through a communication network and acquire the public key from the server apparatus.

Figure 10:
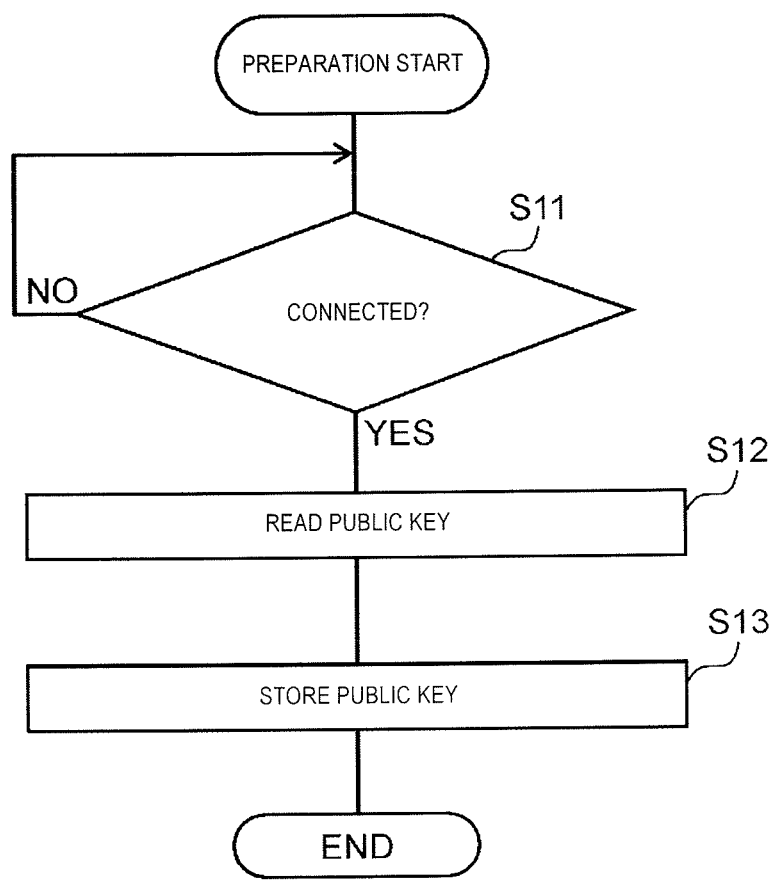
FIG. 10 is a flowchart illustrating one example of a preparation operation procedure by the PC in the first exemplary embodiment.

FIG. 10 is a flowchart illustrating one example of a preparation operation procedure by PC 50. FIG. 10 illustrates acquisition of the public key through a communication network.

In the case of acquisition of the public key from the server apparatus through the communication network, an encrypted communication protocol using, for example, a public key infrastructure (PKI) is widely used. The encrypted communication protocol includes, for example, secure sockets layer (SSL)/transport layer security (TLS). In PKI, each device connected to a network authenticates by using digital certificates that are issued by trusted certificate authorities.

A communicator of PC 50 waits until being connected through communication network 40 to the server apparatus in which public key KPE is registered (S11).

Data reader 61, if being connected to the server apparatus through the communicator, reads public key KPE that corresponds to secret key KSE retained by camera 20 (S12). While the public key is set per camera here, data reader 61 may read the public key corresponding to the image data in the case of the public key being different per image data.

Verification key storage 71 stores the public key read by data reader 61 (S13). Then, PC 50 finishes the public key acquisition operation.

Figure 11:
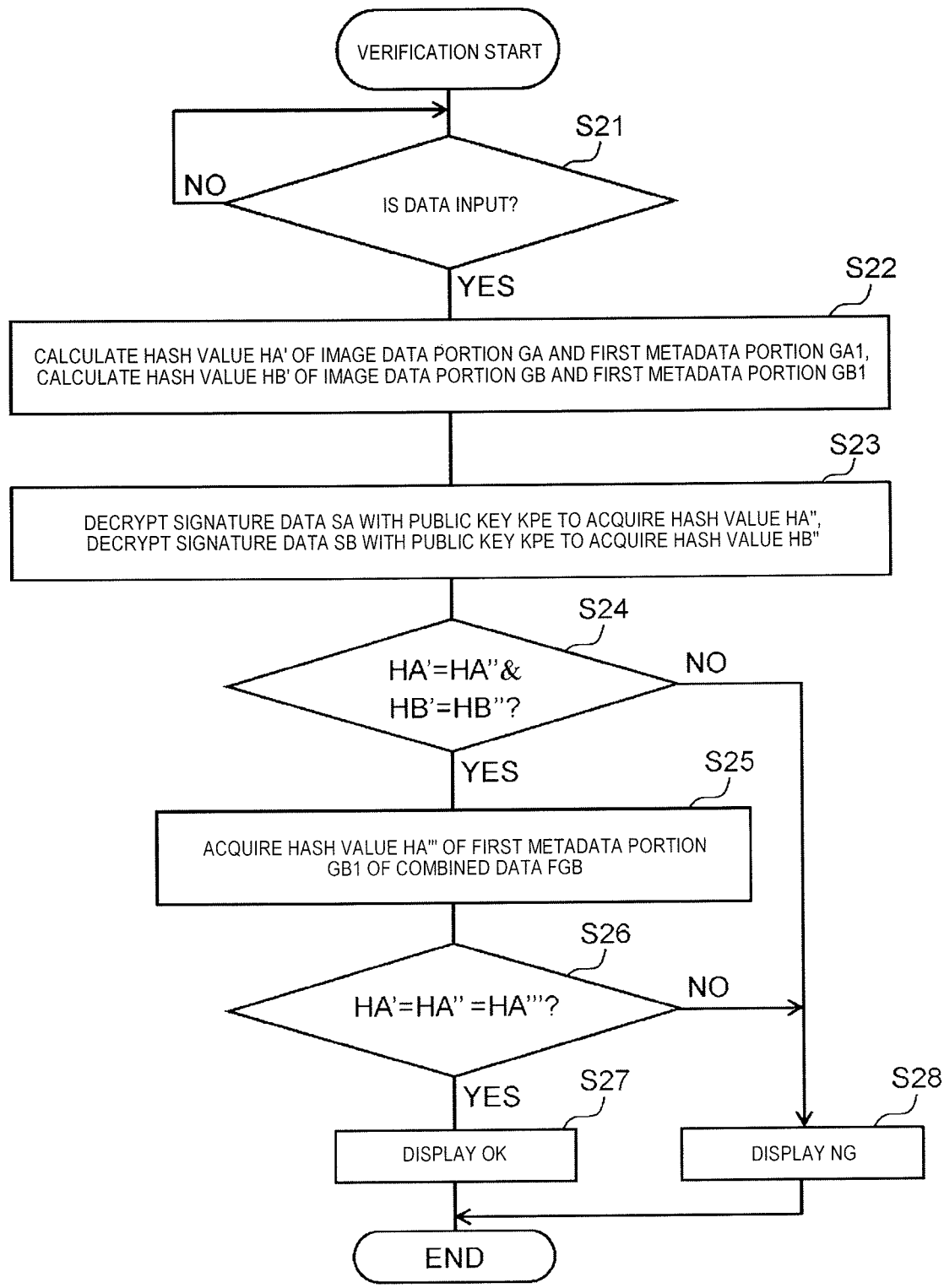
FIG. 11 is a flowchart illustrating one example of a verification operation procedure by the PC in the first exemplary embodiment.

FIG. 11 is a flowchart illustrating one example of a verification operation procedure by PC 50.

Data reader 61 waits until receiving input of the combined data captured in camera 20 (S21). Here, combined data FGA and combined data FGB that include two successive images are assumed to be input.

If combined data FGA and combined data FGB are read by data reader 61, hash calculator 62 calculates hash value HA' of image data GA of image data portion GA0 and first metadata portion GA1 of combined data FGA (S22). Similarly, hash calculator 62 calculates hash value HB' of image data GB of image data portion GB0 and first metadata portion GB1 of combined data FGB (S22).

Signature decrypter 63 decrypts signature data SA of second metadata portion GA2 of combined data FGA with public key KPE to acquire hash value HA" (S23). Similarly, signature decrypter 63 decrypts signature data SB of second metadata portion GB2 of combined data FGB with public key KPE to acquire hash value HB" (S23).

Signature data verifier 64 determines whether or not hash value HA' is equal to hash value HA" and hash value HB' is equal to hash value HB" (S24).

In the case of hash value HA' being equal to hash value HA" and hash value HB' being equal to hash value HB", signature data verifier 64 determines verification of correctness of each of combined data FGA and combined data FGB to succeed. In this case, determiner 65 acquires hash value HA''' of first metadata portion GB1 read in data reader 61 (S25).

Determiner 65 compares hash value HA' (=HA'') with hash value HA''' (S26).

In the case of hash value HA' being equal to hash value HA''', determiner 65 determines each of image data GA and image data GB to be correct and determines successiveness of image data GA and image data GB to be guaranteed. In this case, result outputter 66 causes display 73 to display "OK" that represents successful verification (S27). Then, PC 50 finishes the present operation.

Meanwhile, in the case of hash value HA' being different from hash value HA" or hash value HB' being different from hash value HB" in S24, determiner 65 determines verification of correctness of image data GA and image data GB to fail (tampered).

In the case of hash value HA' (=HA") being different from hash value HA''' in S26, determiner 65 determines successiveness of image data GA and image data GB not to be guaranteed.

Result outputter 66, in the case of image data GA and image data GB not being correct or in the case of successiveness of image data GA and image data GB not being guaranteed, causes display 73 to display "NG" that represents failed verification (S28). Then, PC 50 finishes the present operation.

Accordingly, signature processing system 10 can verify each of a plurality of pieces of image data and can improve reliability of image data having successiveness. Accordingly, data not being tampered or deleted can be guaranteed, and correlation of a plurality of pieces of image data can be ensured. Therefore, evidentiality of image data can be improved.

Modification Example

Figure 12:
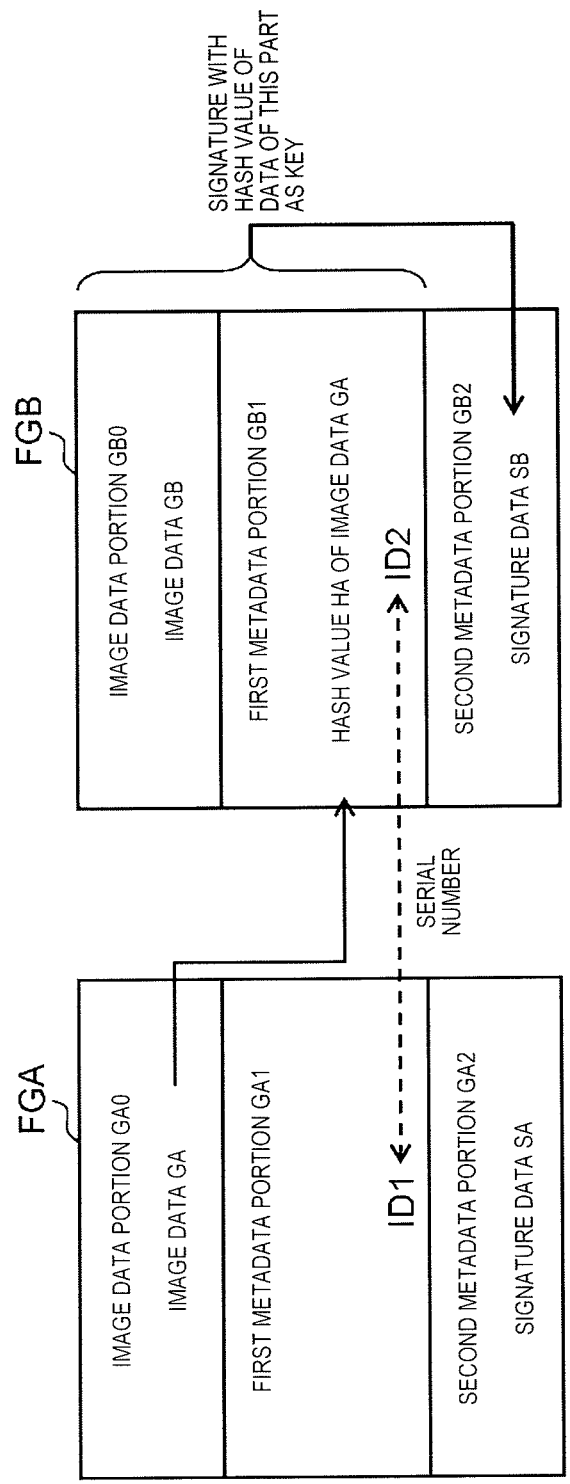
FIG. 12 is a schematic diagram for describing relevance of image data in a modification example.

FIG. 12 is a schematic diagram for describing relevance of image data in a modification example. First metadata portion GB1 of combined data FGB stores hash value HA of previous image data GA and the current ID number (ID2). The current ID number (ID2) is, for example, a value that is counted up by a value of one from the previous ID number (ID1), and may be any value if relevance (for example, successiveness) of the current data and the previous data can be identified. The ID number is generated per image data by ID generator 31.

Signature data SB stored in second metadata portion GB2 is generated based on current image data GB, hash value HA of previous image data GA, and the current ID number (ID2). Specifically, signature processor 32 calculates a hash value by using a hash function for image data GB, hash value HB, and the current ID number and encrypts the hash value by using the signature key to generate signature data SB.

Accordingly, the ID number is included in the first metadata portion in the modification example. Thus, the order of capturing can be promptly confirmed by confirming the ID number. In the case of visibly embedding the ID number in the image data by digital watermarking or the like, visibility of the ID number is improved, and a user can easily recognize successiveness of the image data. Since the signature data is generated by using the hash value of the previous image data and the ID number, evidentiality is improved, and successiveness can be easily and highly accurately confirmed.

Linking the ID number with the hash value as the correlation information can improve evidential admissibility of successiveness among a plurality of pieces of image data. Accordingly, in the case of coincidentally connected image data captured by different camera 20, adding both of the ID and the hash value can further improve evidentiality.

While the modification example in FIG. 12 illustrates the case of using the ID number, the previous signature data or the previous image data or a combination thereof may also be used instead of the ID number. That is, signature data SB stored in second metadata portion GB2 may be generated based on any one or a combination of image data GB, hash value HA of previous image data GA, the current ID number, the previous signature data, and the previous image data.

Specifically, signature processor 32 may calculate a hash value by using a hash function for any one or a combination of image data GB, hash value HA, the current ID number, the previous signature data, and the previous image data. Signature processor 32 may encrypt the hash value by using the signature key to generate signature data SB.

Accordingly, generation of the signature data using any one or a combination of the current ID number, the previous signature data, and the previous image data allows PC 50 to perform signature verification using a plurality of pieces of correlation information. Therefore, PC 50 and signature processing system 10 can highly accurately determine successiveness of a plurality of pieces of image data and can guarantee relevance among the plurality of pieces of image data.

Second Exemplary Embodiment

The first exemplary embodiment illustrates guaranteeing successiveness of image data by storing the hash value of the image data in the first metadata portion and using the hash value as the correlation information. A second exemplary embodiment will illustrate guaranteeing successiveness of image data by using the ID number without using the hash value.

Figure 13:
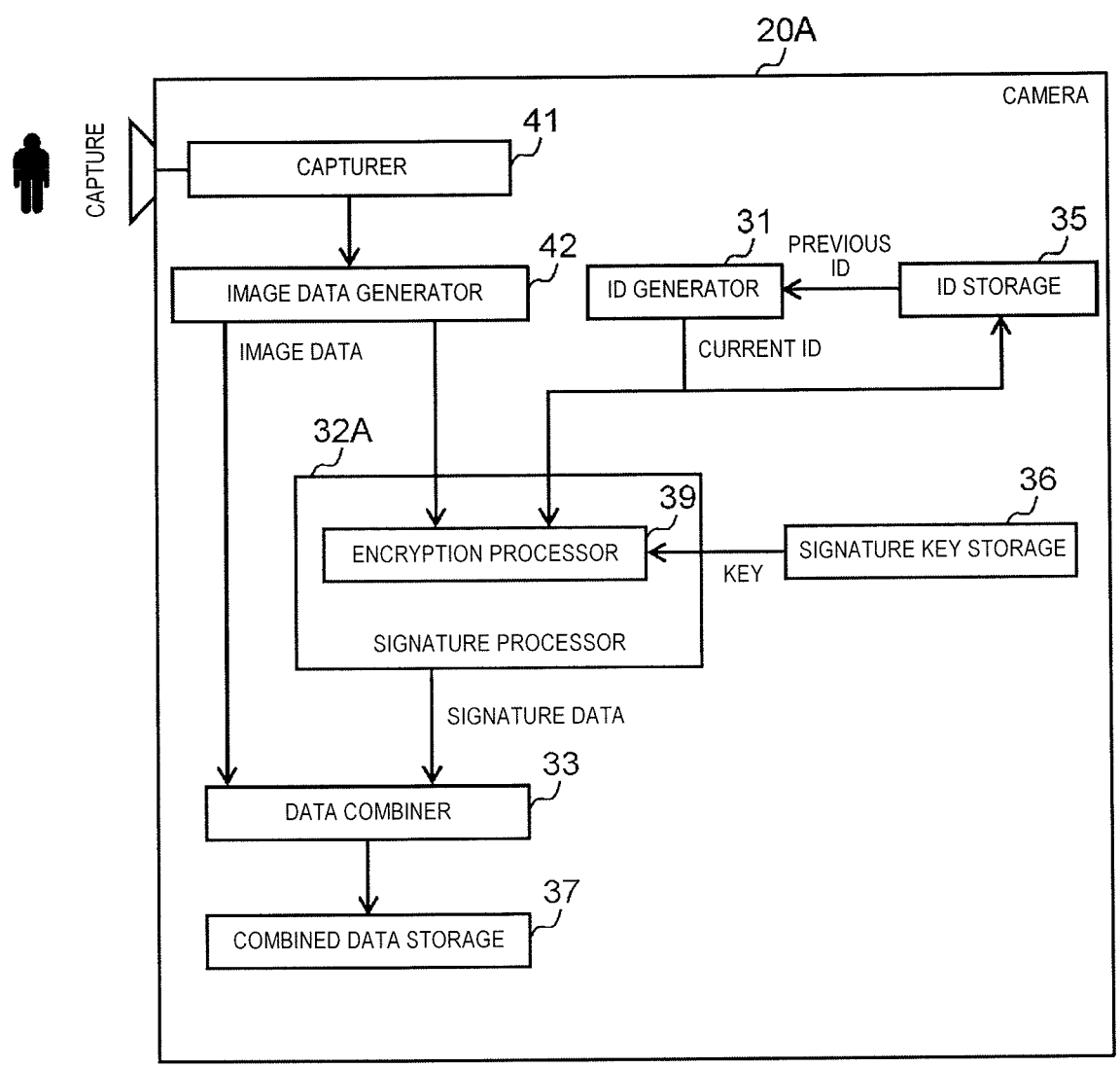
FIG. 13 is a schematic diagram illustrating a functional configuration example of a camera in a second exemplary embodiment.

FIG. 13 is a block diagram illustrating a functional configuration example of camera 20A in the second exemplary embodiment. The same constituents in a signature processing system of the second exemplary embodiment as in the signature processing system of the first exemplary embodiment will be designated by the same reference signs, and descriptions thereof will not be provided or will be simplified.

Camera 20A includes ID generator 31, ID storage 35, capturer 41, image data generator 42, signature key storage 36, signature processor 32A, data combiner 33, and combined data storage 37.

Camera 20A performs digital signature by linking the image data captured by capturer 41 with a consecutive number (ID number). Camera 20A does not have hash calculator 34 and hash data storage 38 and has signature processor 32A, compared with the first exemplary embodiment. ID generator 31 and ID storage 35 that are not used in the first exemplary embodiment are used.

ID generator 31 generates, for the current image data, an ID number as a consecutive number that is counted up by a value of one from the previous ID number stored in ID storage 35, and sends the ID number to signature processor 32A. ID generator 31 stores the updated ID number in ID storage 35.

Signature processor 32A performs signature by encrypting, in encryption processor 39, the image data sent from image data generator 42 and the ID number generated in ID generator 31 using the secret key stored in signature key storage 36, and generates the signature data.

Data combiner 33 combines the image data generated in image data generator 42 with the signature data generated in signature processor 32A to generate combined data. Data combiner 33 stores the combined data in combined data storage 37.

Figure 14:
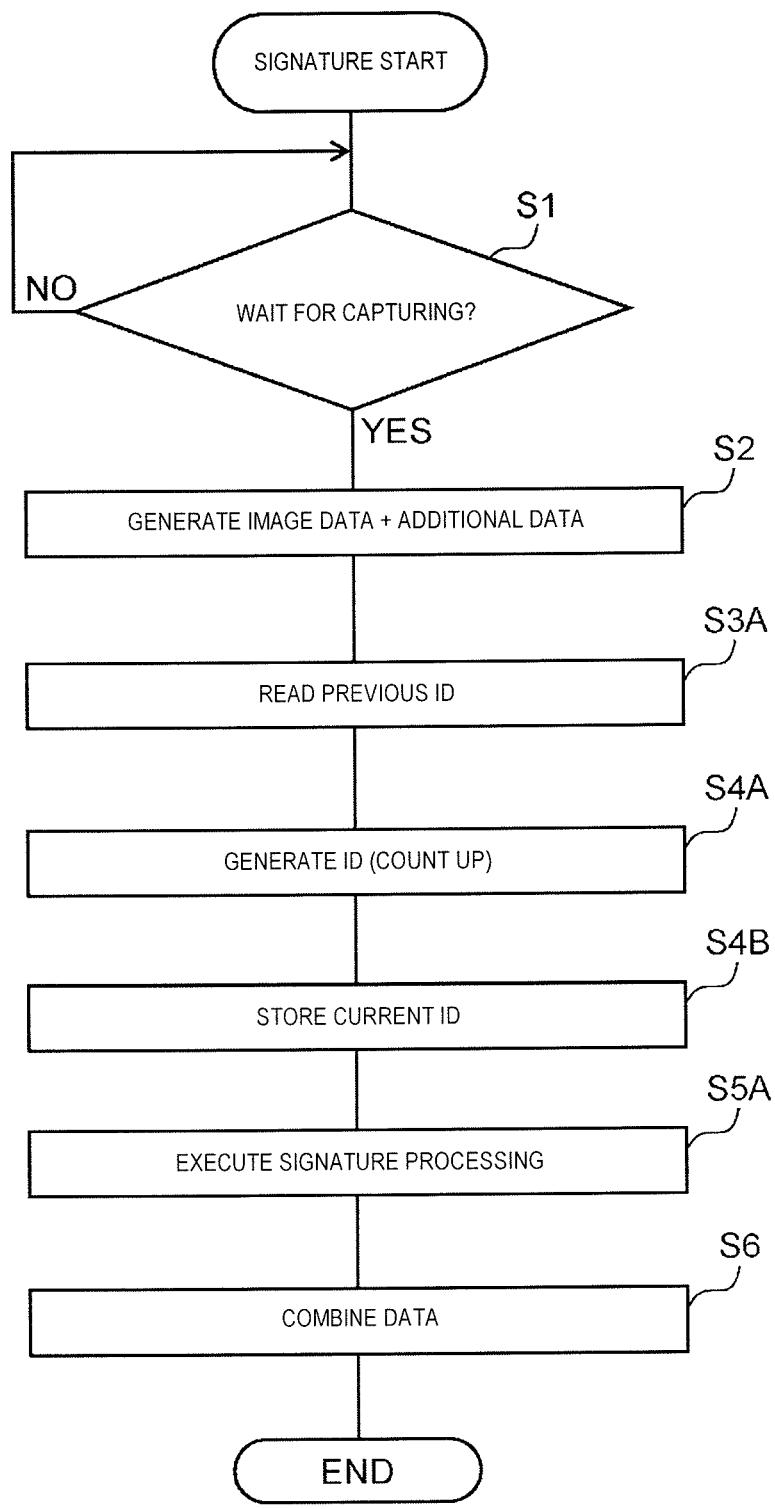
FIG. 14 is a flowchart illustrating one example of a signature operation procedure by the camera in the second exemplary embodiment.

FIG. 14 is a flowchart illustrating one example of a signature operation procedure by camera 20A. The same steps in FIG. 14 as the steps in FIG. 9 in the first exemplary embodiment will be designated by the same step numbers, and descriptions thereof will not be provided or will be simplified.

If image data generator 42, in S2, generates the image data or the image data to which the additional data is added, ID generator 31 reads the previous ID number from ID storage 35 (S3A).

ID generator 31, for example, generates the current ID number, as a consecutive number in units of image data, by counting up the previous ID number by a value of one (S4A).

ID storage 35 updates the ID number generated in ID generator 31 by, for example, overwriting and stores the updated ID number (S4B).

Signature processor 32A encrypts the image data generated in image data generator 42 and the ID number generated in ID generator 31 with the secret key stored in signature key storage 36 to generate the signature data (S5A). Operation of data combiner 33 combining the image data with the signature data to generate the combined data is the same as in the first exemplary embodiment.

A PC has data reader 61, signature decrypter 63, verification key storage 71, and determiner 65 like PC 50 of the first exemplary embodiment. Signature decrypter 63 decrypts the signature data by using the public key and reads the ID number included in the signature data. Determiner 65 compares the ID number with the ID numbers of the previous and subsequent image data to determine the presence or absence of successiveness. Correctness of the signature data can also be verified.

That is, the PC of the present exemplary embodiment verifies correctness and successiveness of the image data by using, instead of the hash value of the previous image data that has correlation with the current image data, the current ID number that has correlation with the ID number added to the previous image data.

Accordingly, in the second exemplary embodiment, successiveness (relevance) of the image data can be verified by, for example, generating the signature data using the ID number of a serial number as the correlation information.

FIG. 15A and FIG. 15B are schematic diagrams for describing one example of relevance of the image data in the combined data having various file structures.

FIG. 15A illustrates the case of encrypting image data GA (GB) of image data portion GA0 (GB0) and the ID number of first metadata portion GA1 (GB1) with the secret key to acquire signature data SA (SB). The ID number is, for example, a serial number that is a consecutive number as described above.

FIG. 15B illustrates the case of inserting the ID number as a watermark or an image in image data GA (GB) of image data portion GA0 (GB0) and encrypting image data GA (GB) with the public key to acquire signature data SA (SB). Accordingly, since the signature data is generated by using the ID number of, for example, a serial number, relevance of the image data is acquired.

The second exemplary embodiment illustrates the case of guaranteeing successiveness of the image data by using the ID number (identification number) as the correlation information without using the hash value. Besides, the signature data or the previous or subsequent image data may also be used as the correlation information. In this case, the PC may determine the presence or absence of correctness and successiveness of the combined data by using the signature data or the image data in the same manner as the ID number.

Accordingly, relevance among a plurality of pieces of image data can be easily ensured by using the ID number as the correlation information.

Third Exemplary Embodiment

A third exemplary embodiment assumes using the signature data as the correlation information without using the hash value.

Figure 16:
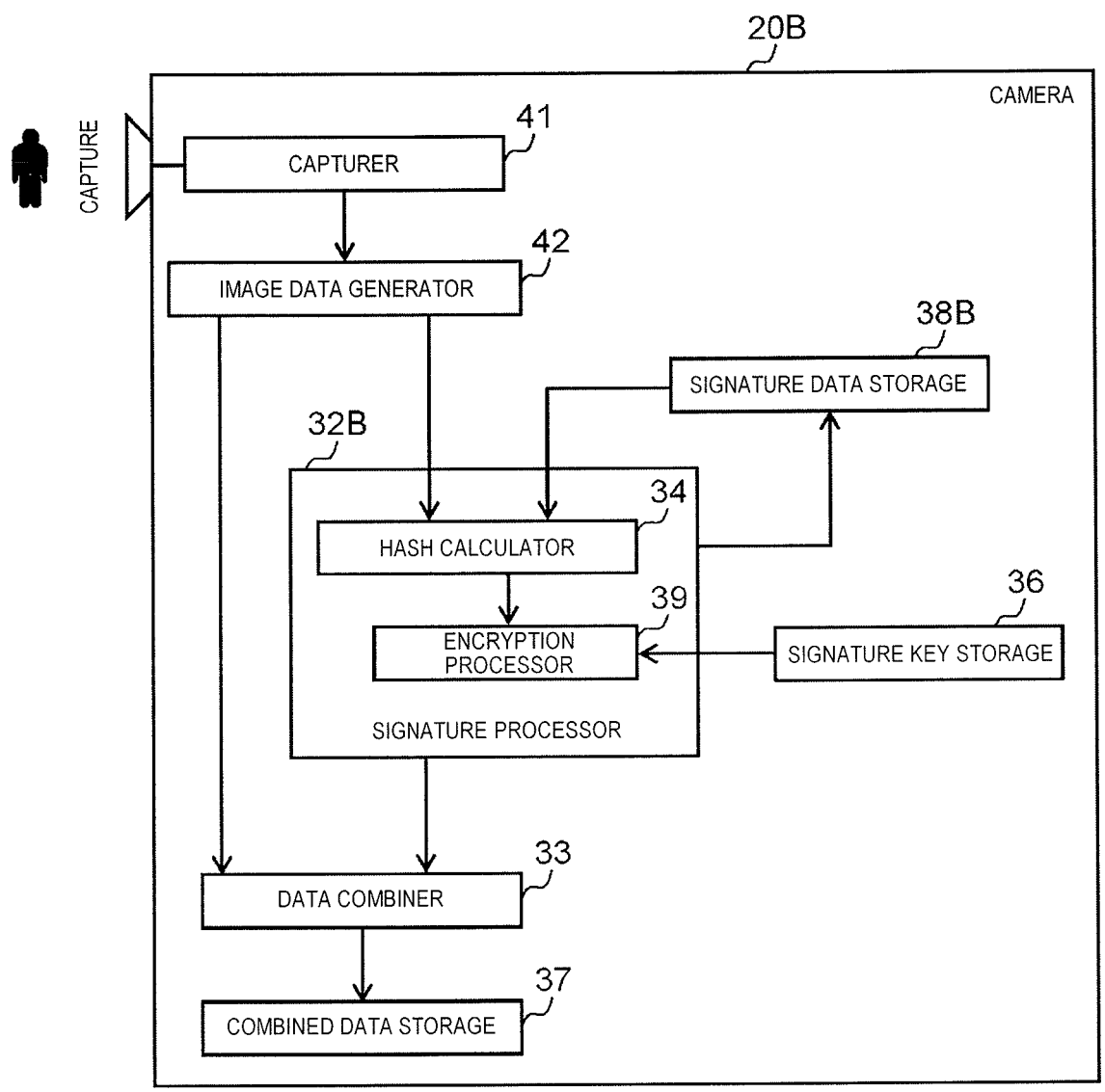
FIG. 16 is a schematic diagram illustrating a functional configuration example of a camera in a third exemplary embodiment.

FIG. 16 is a block diagram illustrating a configuration example of camera 20B in the third exemplary embodiment. Camera 20B includes capturer 41, image data generator 42, signature processor 32B, signature key storage 36, signature data storage 38B, data combiner 33, and combined data storage 37.

The same constituents in camera 20B as in cameras 20 and 20A will be designated by the same reference signs, and descriptions thereof will not be provided or will be simplified.

Signature processor 32B performs signature by encrypting, in encryption processor 39, the image data sent from image data generator 42 and the signature data (previous signature data) stored in signature data storage 38B using the secret key stored in signature key storage 36, and generates the signature data. The generated signature data (current signature data) is sent to signature data storage 38B.

Signature data storage 38B, for example, stores the signature data (current signature data) generated by signature processor 32B.

Figure 17:
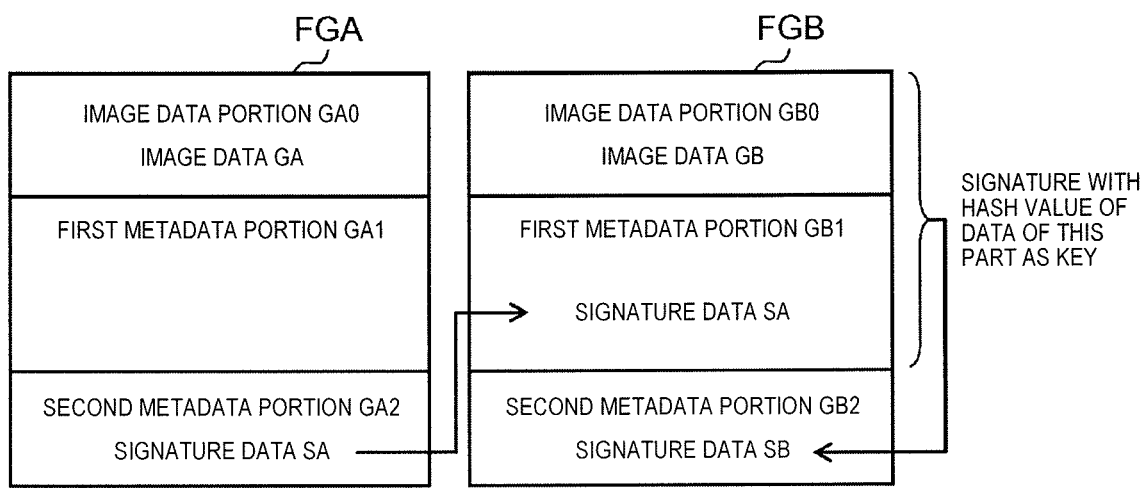
FIG. 17 is a schematic diagram for describing relevance of image data in a third exemplary embodiment.

FIG. 17 is a schematic diagram for describing one example of relevance of the image data in the combined data having a file structure in the present exemplary embodiment.

FIG. 17 corresponds to FIG. 8A, FIG. 12, FIG. 15A, and the like. FIG. 17 is the same as FIG. 8A and the like except that signature data SA is stored in first metadata portion GB1 of combined data FGB. That is, the correlation information is the signature data. The same applies in the case of generating the correlation information from three or more pieces of data of the combined data.

Accordingly, relevance among a plurality of pieces of image data can be ensured by using the signature data as the correlation information.

Fourth Exemplary Embodiment

A fourth exemplary embodiment assumes using the image data as the correlation information without using the hash value.

Figure 18:
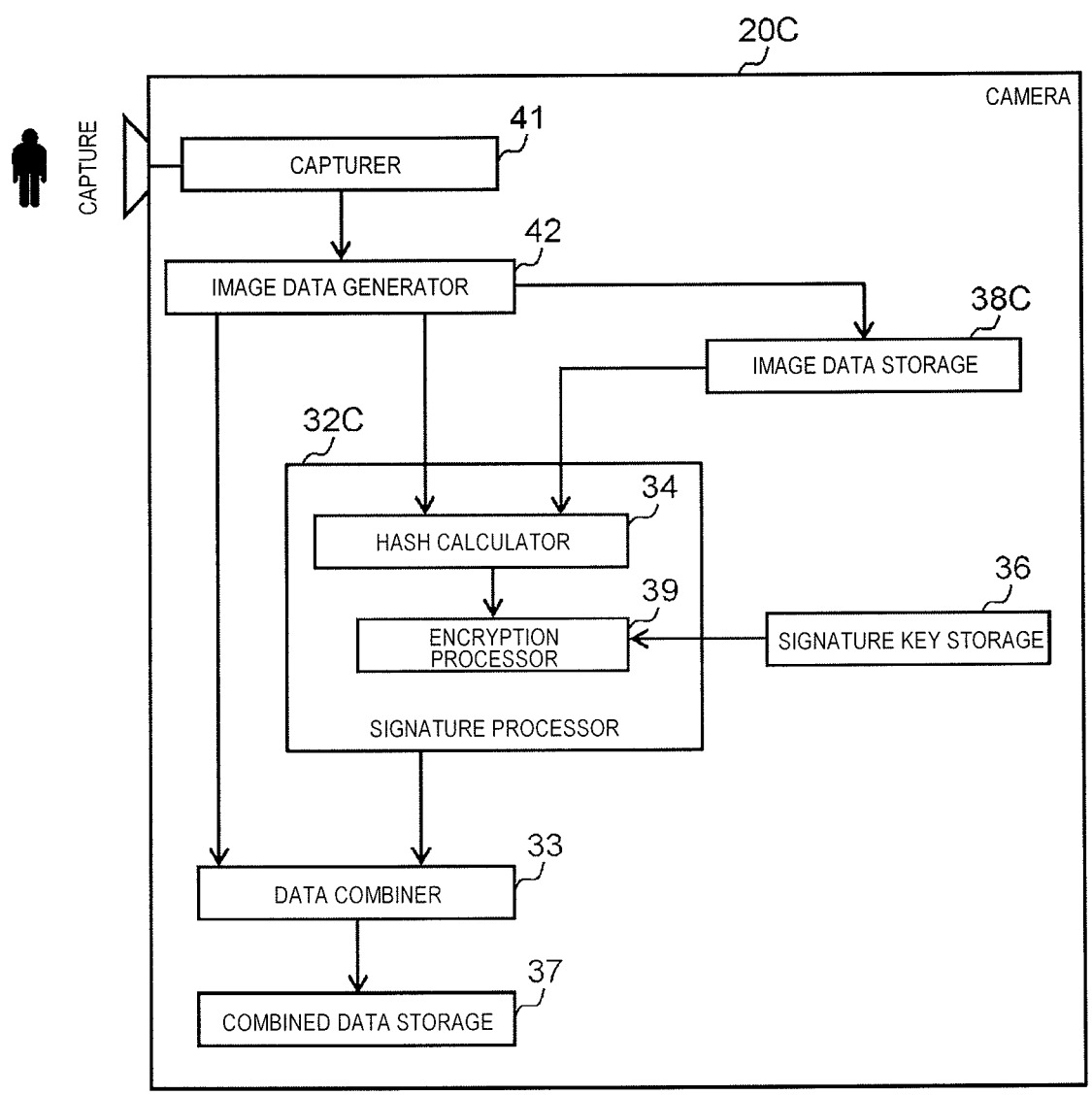
FIG. 18 is a schematic diagram illustrating a functional configuration example of a camera in a fourth exemplary embodiment.

FIG. 18 is a block diagram illustrating a configuration example of camera 20C in the fourth exemplary embodiment. Camera 20C includes capturer 41, image data generator 42, signature processor 32C, signature key storage 36, image data storage 38C, data combiner 33, and combined data storage 37.

The same constituents in camera 20C as in cameras 20, 20A, and 20B will be designated by the same reference signs, and descriptions thereof will not be provided or will be simplified.

Signature processor 32C performs signature by encrypting, in encryption processor 39, the image data sent from image data generator 42 and the image data (previous images data) stored in image data storage 38C using the secret key stored in signature key storage 36, and generates the signature data.

Image data storage 38C, for example, stores the image data (current image data) generated by image data generator 42.

Figure 19:
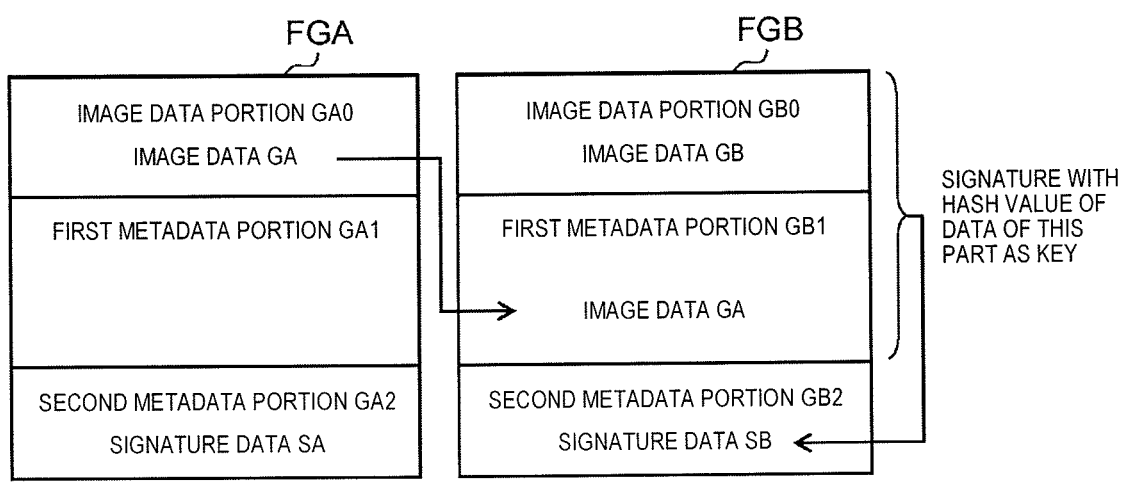
FIG. 19 is a schematic diagram for describing relevance of image data in the fourth exemplary embodiment.

FIG. 19 is a schematic diagram illustrating a file structure example in the present exemplary embodiment. FIG. 19 corresponds to FIG. 8A, FIG. 12, FIG. 15A, FIG. 18, and the like. FIG. 19 is the same as FIG. 8A and the like except that image data GA is stored in first metadata portion GB1 of combined data FGB. That is, the correlation information is the image data. The same applies in the case of generating the correlation information from three or more pieces of data of the combined data.

Accordingly, relevance among a plurality of pieces of image data can be ensured by using the image data as the correlation information.

As described heretofore, cameras 20 and 20A to 20C of signature processing system 10 of the above exemplary embodiments include capturer 41 and signature processors 32 and 32A to 32C. Capturer 41 acquires a plurality of mutually related pieces of image data that includes first image data. Signature processors 32 and 32A to 32C generate first signature data for first data and correlation information based on the first image data, correlation information indicating correlation among the plurality of pieces of image data, and a signature key.

Accordingly, cameras 20 and 20A to 20C can generate signature data so that PC 50 can confirm tampering or deletion (missing or the like) of the plurality of pieces of image data related to each other in the correlation information. Therefore, cameras 20 and 20A to 20C, PC 50, and the signature processing system 10 can improve the ability to ensure relevance (for example, successiveness) of the image data.

Thus, cameras 20 and 20A to 20C, PC 50, and signature processing system 10 can improve evidential admissibility without using, for example, an expensive one-time storage medium that is writable only once. Cameras 20 and 20A to 20C can allow the combined data to be in a state verifiable by PC 50 independently of types of storage media into which the combined data generated after signature processing is written.

Thus, PC 50, for example, even in the case of the image data being tampered after being read from a one-time storage medium, can confirm tampering of the image data by using a hash value or the like and, furthermore, can confirm the presence or absence of relevance of the image data.

Therefore, PC 50 can easily ensure that an owner or a manager of cameras 20 and 20A to 20C, for example, does not delete one or a part of an inconvenient photograph from successive photographs (a plurality of successive pieces of image data) that are not intentionally tampered or deleted.

Capturer 41 may acquire a plurality of time-series successive pieces of data. Accordingly, cameras 20 and 20A to 20C and the signature processing system 10 can improve the ability to ensure relevance of the image data.

Capturer 41 may capture the first image data and second image data. Signature processors 32 and 32A may generate the first signature data based on the first image data, correlation information indicating correlation between the first image data and the second image data, and the signature key.

Accordingly, PC 50, for example, in the case of two successive pieces of image data, can confirm the presence or absence of relevance of two pieces of image data by referencing the correlation information.

Signature processors 32 and 32A may generate the first signature data based on the hash value of the second image data as the correlation information.

Accordingly, camera 20 and the signature processing system 10 can determine the presence or absence of relevance of the first image data and the second image data by using a unidirectional unique value related to the image data. Camera 20 can easily generate the correlation information by using the hash value.

Cameras 20 and 20A may include ID generator 31 that generates the ID of the image data. Signature processors 32 and 32A may generate the first signature data based on the ID of the first image data as the correlation information.

Accordingly, cameras 20 and 20A and the signature processing system 10 can determine the presence or absence of relevance of the first image data and the second image data by using the ID added to each piece of image data. Cameras 20 and 20A may generate the ID as, for example, a serial number and thus can easily generate the correlation information.

Signature processor 32B may generate the first signature data based on second signature data for the second image data as the correlation information.

Accordingly, for example, since the second signature data that is generated based on the second image data successive to the first image data is the correlation information, PC 50 can determine the presence or absence of relevance of the first image data and the second image data.

Signature processor 32C may generate the first signature data based on the second image data as the correlation information.

Accordingly, camera 20C and the signature processing system 10 can use, for example, successive image data as the correlation information and thus can simply acquire the correlation information and can easily perform signature generation.

The ID of the first image data may be displayed by display 73 as visible data that is added to the first data.

Accordingly, cameras 20 and 20A and the signature processing system 10, for example, can improve visibility of the ID by digital watermarking or the like in the first image data that is to be examined for tampering or relevance with the previous and subsequent image data. Cameras 20 and 20A and the signature processing system can facilitate handling of the correlation information by using the visible data. The ID may be written into, for example, a part of an empty format of the first image data.

Cameras 20 and 20A to 20C may include a sender that sends the plurality of pieces of image data and the first signature data.

Accordingly, cameras 20 and 20A to 20C can simply send the image data as a relevance search target and the signature data to PC 50.

PC 50 includes data reader 61, signature decrypter 63, signature data verifier 64, and determiner 65. Data reader 61 acquires the plurality of mutually related pieces of image data including the first image data and the first signature data. The first signature data is data acquired by signature processing of the first image data and the correlation information indicating correlation among the plurality of pieces of image data. Signature decrypter 63 decrypts the first signature data by using a verification key. Determiner 65 determines the presence or absence of relevance among a plurality of pieces of data based on the correlation information.

Accordingly, PC 50 can confirm tampering or deletion (missing or the like) of the plurality of pieces of image data related to each other in the correlation information. Therefore, cameras 20 and 20A to 20C, PC 50, and the signature processing system 10 can improve the ability to ensure relevance (for example, successiveness) of the image data.

Thus, cameras 20 and 20A to 20C, PC 50, and signature processing system 10 can improve evidential admissibility without using, for example, an expensive one-time storage medium that is writable only once. PC 50 can verify the image data independently of types of storage media into which the combined data generated after signature processing is written.

PC 50, for example, even in the case of the image data being tampered after being read from a one-time storage medium, can confirm tampering of the image data by using a hash value or the like and, furthermore, can confirm the presence or absence of relevance of the image data.

Therefore, PC 50 can easily ensure that an owner or a manager of cameras 20 and 20A, for example, does not delete one or a part of an inconvenient photograph from successive photographs (a plurality of successive pieces of image data) that are not intentionally tampered or deleted.

Data reader 61 may acquire a plurality of time-series successive pieces of data. Accordingly, cameras 20 and 20A to 20C, PC 50, and the signature processing system 10 can improve the ability to ensure relevance of the image data.

Data reader 61 may acquire the first image data and the second image data. Determiner 65 may determine the presence or absence of relevance among the plurality of pieces of image data based on the hash value of the second image data as the correlation information.

Accordingly, a hash value that can be easily derived from the image data and has higher stability in a characteristic of unidirectionality is used as the correlation information. Therefore, PC 50 can determine the presence or absence of tampering or the presence or absence of relevance among the plurality of pieces of image data with reduced load related to signature verification.

PC 50 may include hash calculator 62 that derives a first hash value (for example, HA') that is the hash value of the second image data. Signature decrypter 63 may decrypt the first signature data by using the verification key to acquire a second hash value (for example, HA"). Determiner 65 may determine the presence or absence of relevance of the first image data and the second image data based on the first hash value, the second hash value, and a third hash value (for example, HA''') that is the hash value of the second image data included in the first image data.

Accordingly, PC 50 can confirm, from, for example, matching of the first hash value and the second hash value, matching of the second image data in cameras 20 and 20A as the signature generation device and the second image data in PC 50 as the signature verification device. That is, PC 50 can confirm the second image data not being tampered.

Furthermore, PC 50 can confirm, from matching of the first hash value or the second hash value and the third hash value, for example, matching of the hash value of the second image data included in the combined data including the first image data and the hash value calculated from the second image data. Therefore, since matching of the same image data (second image data) can be confirmed from two mutually related pieces of image data, PC 50 can ensure that, for example, an owner of cameras 20 and 20A does not delete image data from the two pieces of image data.

While various exemplary embodiments are described heretofore with reference to the drawings, the present disclosure is obviously not limited to such examples. It is apparent for those skilled in the art to perceive various modification examples or correction examples within the scope disclosed in the claims, and those examples are obviously understood to fall within the technical scope of the present disclosure.

While the above exemplary embodiments illustrate the signature generation device as being applied to a digital still camera that can capture a still image, the signature generation device is not limited thereto and may be applied to a video camera such as a monitoring camera that can capture a moving image.

The signature generation device may also be applied to, for example, a recorder (audio recording apparatus) that collects audio with an audio collecting device (microphone) and records audio data, or to a private branch exchange (PBX) that can record audio. In this case, correctness, successiveness, or evidentiality of the audio data can be improved. The signature generation and the signature verification of the above exemplary embodiments may also be applied to data that includes both audio data and image data.

The above exemplary embodiments illustrate, as the plurality of related pieces of data, time-series pieces of data such as a plurality of pieces of image data that is successively captured by cameras 20 and 20A. The plurality of related pieces of data is not limited thereto and is exemplified by various types of data (for example, data that has determined relevance with the previous and subsequent data such as threaded beads or data that has a partially common value to another data in a group of pieces of data).

Not all pieces of data such as the previous and subsequent data may be targets of the related pieces of data, and the correlation information of, for example, every two pieces or every three pieces of data of the plurality of related pieces of data that are successive in time series may also be used. In this case, the signature processing system, for example, can determine whether or not relevance exists at certain intervals in the plurality of pieces of data.

In the case of finding relevance of a plurality of any pieces of data that is not a plurality of successive pieces of data, the camera. for example, may embed, into one piece of data of the plurality of pieces of data to be examined for relevance, the correlation information that is based on another piece of data of the plurality of pieces of data. Accordingly, PC 50 can determine the presence or absence of relevance of a plurality of any pieces of data.

INDUSTRIAL APPLICABILITY

The present disclosure is useful for a signature generation device, a signature verification device, a signature generation method, a signature verification method, and the like that can ensure relevance among a plurality of pieces of data.

REFERENCE MARKS IN THE DRAWINGS

10 signature processing system
20, 20A, 20B, 20C camera
20y signature function
20z image data generation function
21, 51 CPU/RAM
22, 52 HDD
23 ASIC 31 ID generator
32, 32A, 32B, 32C signature processor
33 data combiner
34, 62 hash calculator
35 ID storage
36 signature key storage
37 combined data storage
38 hash data storage
38B signature data storage
38C image data storage
39 encryption processor
41 capturer
42 image data generator
50 PC
50x signature verification function
50y signature decryption function
50z public key acquisition function
53 monitor
61 data reader
63 signature decrypter
64 signature data verifier
65 determiner
66 result outputter
71 verification key storage
73 display

The invention claimed is:

1. A signature generation device comprising:
a processor and a memory that stores an instruction, wherein upon execution of the instruction, the processor operates as:
a data acquirer that acquires a plurality of mutually related pieces of data including first data, second data, and third data;
an identification information generator that generates identification information of the data acquired by the data acquirer;
a unidirectional function deriver that derives one or more hash values of the plurality of mutually related pieces of data, the one or more hash values comprising at least a hash value of the second data and a hash value of the third data; and
a signature generator that generates first signature data for the first data based on the identification information of the first data as correlation information, the first data, and a signature key, the correlation information indicating correlation of the first data and the second data and comprising the hash value of the second data and the hash value of the third data.

2. The signature generation device of claim 1,
wherein the data acquirer acquires the plurality of pieces of data that is successive in time series.

3. The signature generation device of claim 1,
wherein the identification information of the first data is displayed by a display device as visible data that is added to the first data.

4. The signature generation device of claim 1,
wherein the data acquirer includes a capturer and acquires image data captured by the capturer.

5. The signature generation device of claim 1,
wherein the data acquirer includes an audio collector and acquires audio data collected by the audio collector.

6. The signature generation device of claim 1, further comprising:
a sender that sends the plurality of pieces of data and the first signature data.

7. The signature generation device of claim 3,
wherein the data acquirer acquires the plurality of pieces of data that is successive in time series.

8. The signature generation device of claim 3,
wherein the data acquirer includes a capturer and acquires image data captured by the capturer.

9. The signature generation device of claim 3,
wherein the data acquirer includes an audio collector and acquires audio data collected by the audio collector.

10. The signature generation device of claim 3, further comprising:
a sender that sends the plurality of pieces of data and the first signature data.

11. A signature verification device comprising:
a processor a memory that stores an instruction, wherein upon execution of the instruction, the processor operates as:
a data acquirer that acquires a plurality of mutually related pieces of data including first data, second data, and third data and acquires first signature data generated by signature processing of the first data based on identification information of the first data as correlation information, the first data, and a signature key, the correlation information indicating correlation of the first data and the second data and comprising a hash value of the second data and a hash value of the third data;
a signature decrypter that decrypts the first signature data by using a verification key; and
a relevance determiner that determines the presence or absence of relevance among the plurality of pieces of data based on the correlation information.

12. The signature verification device of claim 11,
wherein the data acquirer acquires the plurality of pieces of data that is successive in time series.

13. The signature verification device of claim 11,
wherein the data acquirer acquires the first data and second data, and
the relevance determiner determines the presence or absence of relevance among the plurality of pieces of data based on a hash value of the second data as the correlation information.

14. The signature verification device of claim 13, further comprising:
a unidirectional function deriver that derives a first hash value which is the hash value of the second data,
wherein the signature decrypter decrypts the first signature data by using the verification key to acquire a second hash value, and
the relevance determiner determines presence or absence of relevance of the first data and the second data based on the first hash value, the second hash value, and a third hash value that is the hash value of the second data included in the first data.

15. The signature verification device of claim 11,
wherein the data acquirer receives the plurality of pieces of data and the first signature data.

16. A signature generation method in a signature generation device, the method comprising:
acquiring a plurality of mutually related pieces of data including first data, second data, and third data;
generating identification information of the data acquired;
deriving one or more hash values of the plurality of mutually related pieces of data, the one or more hash values comprising at least one hash value of the second data and a hash value of the third data; and
generating first signature data for the first data based on the identification information of the first data as correlation information, the first data, and a signature key, the correlation information indicating correlation of the first data and the second data and comprising the hash value of the second data and the hash value of the third data.

17. A signature verification method in a signature verification device comprising:
acquiring a plurality of mutually related pieces of data including first data, second data, and third data;
acquiring first signature data generated by signature processing of the first data based on identification information of the first data as correlation information, the first data, and a signature key, the correlation information indicating correlation of the first data and the second data and comprising a hash value of the second data and a hash value of the third data;
decrypting the first signature data by using a verification key; and
determining presence or absence of relevance among the plurality of pieces of data based on the correlation information.

* * * * *